US012665196B2

(12) United States Patent
Lee et al.

(10) Patent No.: US 12,665,196 B2
(45) Date of Patent: Jun. 23, 2026

(54) METHOD OF SYNTHESIZING POROUS COMPOSITE INCLUDING SINGLE ATOM METAL CATALYSTS AND NITROGEN ATOMS IN HIERARCHICAL CARBON MATERIAL FROM CARBON DIOXIDE CONTAINING GAS

(71) Applicant: KOREA ADVANCED INSTITUTE OF SCIENCE AND TECHNOLOGY, Daejeon (KR)

(72) Inventors: Jae W Lee, Daejeon (KR); Jeong Woo Yang, Daejeon (KR); Hodong Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 927 days.

(21) Appl. No.: 17/811,583

(22) Filed: Jul. 9, 2022

(65) Prior Publication Data

US 2023/0055011 A1      Feb. 23, 2023

(30) Foreign Application Priority Data

Aug. 23, 2021     (KR) ........................ 10-2021-0110873

(51) Int. Cl.
| | |
|---|---|
| *H01M 4/587* | (2010.01) |
| *C01B 32/348* | (2017.01) |
| *C01B 32/372* | (2017.01) |
| *H01M 4/02* | (2006.01) |
| *H01M 4/36* | (2006.01) |
| *H01M 4/38* | (2006.01) |

(52) U.S. Cl.
CPC ........... *H01M 4/587* (2013.01); *C01B 32/348* (2017.08); *C01B 32/372* (2017.08); *H01M 4/364* (2013.01); *H01M 4/38* (2013.01); *C01P 2002/72* (2013.01); *C01P 2002/82* (2013.01); *C01P 2002/85* (2013.01); *C01P 2004/03* (2013.01); *C01P 2004/04* (2013.01); *C01P 2006/12* (2013.01); *C01P 2006/16* (2013.01); *C01P 2006/40* (2013.01); *H01M 2004/021* (2013.01); *H01M 2004/028* (2013.01)

(58) Field of Classification Search
CPC ........ H01M 4/587; H01M 4/364; H01M 4/38; H01M 2004/021; H01M 2004/028; C01P 2002/72; C01P 2002/82; C01P 2002/85; C01P 2004/03; C01P 2004/04; C01P 2006/12; C01P 2006/16; C01P 2006/40; C01B 32/372
USPC .... 502/180; 423/445 R, 447.1, 447.3, 447.7, 423/447.8
See application file for complete search history.

(56) References Cited

U.S. PATENT DOCUMENTS

| | | | | |
|---|---|---|---|---|
| 2011/0318254 A1* | 12/2011 | Morishita | ........... | C04B 38/0032 |
| | | | | 264/44 |
| 2017/0113934 A1* | 4/2017 | Kowalewski | ........ | H01G 9/2022 |
| 2021/0147240 A1* | 5/2021 | Eisenberg | ............. | C25B 11/031 |

FOREIGN PATENT DOCUMENTS

| | | | | | |
|---|---|---|---|---|---|
| CN | 103855367 A | * | 6/2014 | ......... | H01M 4/8605 |
| CN | 106229522 A | * | 12/2016 | ......... | H01M 4/9083 |
| KR | 10-2016-0027425 A | | 3/2016 | | |
| KR | 10-2017-0122639 A | | 11/2017 | | |
| KR | 10-2018-0037829 A | | 4/2018 | | |
| KR | 10-2018-0072122 A | | 6/2018 | | |
| KR | 20210080151 A | | 6/2021 | | |

OTHER PUBLICATIONS

Du, Z., et al., "Cobalt in Nitrogen-Doped Graphene as Single-Atom Catalyst for High-Sulfur Content Lithium-Sulfur Batteries", Journal of the American Chemical Society, 2019, pp. 3977-3985, vol. 141, Publisher: ACS Publications.

Kim, Y.K.,. et al., "Facile nano-templated CO2 conversion into highly interconnected hierarchical porous carbon for high-performance supercapacitor electrodes", Carbon, 2018, pp. 215-224, vol. 126.

Office Action issued on May 7, 2024 for Korean Patent Application 10-2022-0096725.

English Translation of Office Action issued on May 7, 2024 for Korean Patent Application 10-2022-0096725.

Tao, Y., et al., "Kinetically-Enhanced Polysulfide Redox Reactions by Nb2O5 Nanocrystals for High-Rate Lithium-Sulfur Battery", Energy & Environmental Science, 2016, pp. 3230-3239, vol. 9, Publisher: Royal Society of Chemistry.

(Continued)

*Primary Examiner* — Patricia L. Hailey

(74) *Attorney, Agent, or Firm* — HULTQUIST, PLLC; Steven J. Hultquist

(57) ABSTRACT

The present invention relates to a method of producing a porous composite comprising single-atom metal catalysts and nitrogen atoms by using a hierarchical carbon material from a carbon dioxide-containing gas. According to the present invention, a composite material is produced by producing a porous carbon material using nanosized templates and carbon dioxide, producing carbon nanotubes from the composite material through a self-templating process, and adding single-atom catalysts to the carbon nanofibers. In addition, it is possible to produce a composite having significantly improved porous characteristics and electrochemical properties by nitrogen atom doping using a nitrogen precursor. The produced composite may be easily applied to a high-energy storage device such as a lithium-sulfur battery.

4 Claims, 16 Drawing Sheets

(56)  References Cited

OTHER PUBLICATIONS

Notice of Allowance issued on Jul. 16, 2024 for Korean Patent Application 10-2022-0096725.
English Translation of Notice of Allowance issued on Jul. 16, 2024 for Korean Patent Application 10-2022-0096725.

* cited by examiner

(a)

(b)

METHOD OF SYNTHESIZING POROUS COMPOSITE INCLUDING SINGLE ATOM METAL CATALYSTS AND NITROGEN ATOMS IN HIERARCHICAL CARBON MATERIAL FROM CARBON DIOXIDE CONTAINING GAS

CROSS-REFERENCE TO RELATED APPLICATION

This application claims priority to and the benefit of Korean Patent Application No. 10-2021-0110873 filed in the Korean Intellectual Property Office on Aug. 23, 2021, the entire contents of which are incorporated herein by reference.

TECHNICAL FIELD

The present invention relates to a method of preparing a porous composite comprising single-atom metal catalysts and nitrogen atoms in a hierarchical carbon material from a carbon dioxide-containing gas, and more particularly, to a method of producing a porous composite containing single-atom metal catalysts and nitrogen atoms in a hierarchical carbon material from a carbon dioxide-containing gas by producing a composite material having improved electrochemical properties by adding single-atom metal catalysts to a carbon material made using nanosized templates and carbon dioxide, and doping the composite material with nitrogen atoms using a nitrogen precursor, thus producing a porous composite having improved single-atom metal catalyst active sites, which may be applied to a lithium-sulfur battery.

BACKGROUND ART

As the amount of the greenhouse gas carbon dioxide, the main culprit of global warming, has gradually increased, commercial energy storage devices that can be used without emitting carbon dioxide gas, such as lithium-ion batteries and supercapacitors, have been developed over the past several decades. However, these energy storage devices are mainly used in low storage capacity portable devices such as mobile phones due to their limited energy storage capacity, and there is a limit to the application of energy storage devices requiring high energy density.

Lithium-sulfur batteries have recently attracted a lot of attention because they a high theoretical energy density (2,600 Wh/kg), which overcomes the above-mentioned disadvantages of energy storage devices and allows their application to systems requiring high storage energy. In the lithium-sulfur battery, sulfur-based materials undergo phase change from solid to liquid or from liquid to solid at the positive electrode during the charging and discharging process. In this process, a shuttle phenomenon occurs in which the sulfur-based materials converted into liquid phase migrate to the opposite negative lithium electrode and cause self-discharge, resulting in a large loss of capacity. In addition, the sulfur-based materials converted into solid phase have a lower conversion rate than the liquid sulfur-based materials, and thus the reaction thereof at high current density does not occur effectively. In addition, the solid sulfur-based materials that are not uniformly distributed cannot be used in the subsequent charge/discharge process, causing irreversible capacity loss.

In recent years, in order to overcome these problems, attempts have been made to minimize the shuttle phenomenon through the formation of strong chemical bonds with the sulfur-based materials and improvement of reaction rates by adding single atom catalysts, in which nitrogen atoms coordinate with transition metals, such as cobalt (Co), iron (Fe), titanium (Ti) or nickel (Ni), to carbon materials (Zhenzhen Du et al., J. Am. Chem. Soc., 141:3977-3985, 2019). Nevertheless, in most existing attempts, it is impossible to uniformly distribute the catalysts and the sulfur-based materials due to the limited surface areas and pore volumes of the carbon materials, and for this reason, it is difficult to maximize the reaction with the sulfides. In addition, in order to overcome these problems, various polymer materials have recently been used to develop carbon materials having a high surface area and pore volume (Yingqing Tao et al., Energy Environ. Sci., 9:3230-3239, 2016). However, this method has problems in that expensive precursors such as polymers and a very complicated process are required to make carbon materials.

Meanwhile, studies have been conducted to synthesize hierarchical porous carbon materials containing abundant micropores (<2 nm) and mesopores (2-50 nm) through a single heat treatment process using templates and carbon dioxide at atmospheric pressure and to apply the same to supercapacitor electrodes (Kim et al., Carbon, 126:215-224, 2018). It is believed that this synthesis method shows the potential of carbon dioxide gas as a new carbon precursor, and that the large surface area of the carbon material (more than 1,000 $m^2$/g) allows uniform distribution of metal catalysts therein and, at the same time, the pore volume thereof (more than 3 $cm^3$/g) may provide a space to be sufficiently impregnated with sulfur-based materials.

These material properties suggest the possibility of applying these materials to secondary batteries such as lithium-sulfur batteries, which are high-capacity energy storage devices, beyond supercapacitors which are low-capacity energy storage devices.

In addition, attempts have been made to improve the performance of lithium-sulfur batteries by adding a nitrogen precursor such as polypyrrole, melamine ($C_3H_6N_6$), polyaniline, ammonia ($NH_3$) or sodium azide ($NaN_3$). Thereamong, ammonia gas treatment can be said to be an effective nitrogen atom doping method because it not only can dope nitrogen atoms, but also contributes to an increase in the pore size of carbon materials during the doping process. However, there is a disadvantage in that it is dangerous to use ammonia gas directly.

Accordingly, the present inventors have made extensive efforts to overcome the above-described problems, and as a result, have produced a composite material having improved electrochemical properties by adding single-atom metal catalysts, which coordinate with nitrogen atoms, to a hierarchical porous carbon material synthesized through a single process of converting carbon dioxide gas by heat treatment, and furthermore, have synthesized a hierarchical porous carbon composite containing single-atom metal catalysts by doping the composite material with nitrogen atoms using an aqueous ammonia solution, and have found that, when the synthesized porous carbon composite is applied to a lithium-sulfur battery, it exhibits excellent performance, thereby completing the present invention.

SUMMARY OF THE INVENTION

Therefore, the present invention has been made in view of the above-described problems with lithium-sulfur batteries, and it is an object of the present invention to provide a method of producing a porous carbon composite, containing a transition metal phthalocyanine catalyst and doped with nitrogen atoms, by adding single-atom iron (Fe) phthalocyanine catalysts, which coordinate with nitrogen atoms, to a carbon dioxide-derived carbon material having a high surface area and pore volume, and subjecting the mixture to a safer and more efficient nitrogen atom doping process using an aqueous ammonia solution.

To achieve the above object, the present invention provides a method of preparing an amorphous hierarchical porous carbon material having micropores (<2 nm) and mesopores (2 to 50 nm), comprising continuous heat-treating a mixture of a reducing agent and nanotemplates in an inert gas and a carbon dioxide-containing gas at a temperature of 500 to 1,000° C. to obtain a solid product.

The present invention also provides a method of preparing a porous carbon composite having transition metal catalytic active sites, the method comprises: (a) adding a reducing agent and nanotemplates to a carbon dioxide-containing gas to obtain a mixture, and allowing the mixture to react at a temperature of 500 to 1,000° C., thus obtaining an amorphous hierarchical porous carbon material; and (b) adding a coordination compound of a transition metal and nitrogen to the amorphous hierarchical porous carbon material, followed by heat treatment.

The present invention also provides a porous carbon composite having transition metal catalytic active sites, in which the porous carbon composite is produced by the above-described method, contains both micropores (<2 nm) and mesopores (2 to 50 nm), and has a surface area of 700 to 1,000 $m^2/g$ and a pore size of 2.0 to 3.5 $cm^3/g$.

The present invention also provides a porous carbon composite having transition metal catalytic active sites, in which the porous carbon composite is produced by the above-described method, contains both micropores (<2 nm) and mesopores (2 to 50 nm), has a surface area of 800 to 1,200 $m^2/g$ and a pore size of 2.5 to 4.0 $cm^3/g$, and is doped with nitrogen atoms.

The present invention also provides a positive electrode for a lithium-sulfur battery comprising the porous carbon composite having transition metal catalytic active sites, the positive electrode having performance of 500 to 1,000 mAh/g when driven at 1.7 to 2.8 V and at 0.5 to 7.0 C.

The present invention also provides a method of preparing hierarchical porous carbon nanofibers having micropores (<2 nm) and mesopores (2 to 50 nm), comprising heat-treating a mixture of polyacrylonitrile and a reducing agent in an inert gas atmosphere and reacting the heat-treated mixture with a carbon dioxide-containing gas at a temperature of 200 to 1,000° C., thus obtaining a solid product.

The present invention also provides a method of preparing a porous carbon composite having transition metal catalytic active sites, the method comprises: (a) obtaining hierarchical porous carbon nanofibers by allowing a mixture of polyacrylonitrile and a reducing agent to react with a carbon dioxide-containing gas at a temperature of 200 to 1,000° C.; and (b) adding a transition metal phthalocyanine, which is a coordination compound of a transition metal and nitrogen, to the porous carbon fibers, followed by heat treatment.

The present invention also provides hierarchical porous carbon nanofibers having transition metal catalytic active sites, in which the hierarchical porous carbon fibers are produced by the above-described method, contain both micropores (<2 nm) and mesopores (2 to 50 nm), and have a surface area of 100 to 300 $m^2/g$ and a pore size of 0.1 to 0.4 $cm^3/g$.

The present invention also provides an interlayer for a lithium-sulfur battery comprising the hierarchical porous carbon nanofibers having transition metal catalytic active sites, the interlayer having performance of 500 to 1,000 mAh/g when driven at 1.7 to 2.8 V and at 0.5 to 7.0 C.

The method of synthesizing an amorphous hierarchical porous carbon material using carbon dioxide as a raw material according to the present invention is an economical and efficient process because it may produce the amorphous hierarchical porous carbon material by a single heat treatment process without using a relatively expensive raw material compared to a conventional method of producing a carbon material having high surface area and pore characteristics by using a polymer.

The carbon material produced by the present invention has a high surface area, and thus a single-atom metal catalyst may be uniformly distributed therein. In addition, the composite containing a single-atom catalyst according to the present invention has high porous characteristics, and thus a sulfur-based material as an active material may be sufficiently impregnated into the internal pores of the composite, thus maximizing the reaction between the catalyst and the active material. Therefore, the composite may be usefully applied to lithium-sulfur batteries having high energy storage capacity, as well as supercapacitors.

The process of doping nitrogen atoms using an aqueous ammonia solution and heat treatment in an inert gas atmosphere according to the present invention is an efficient process because it may dope additional nitrogen atoms in a safer and easier manner than directly using ammonia gas and provides great improvement in electrochemical performance.

In addition, the production method according to the present invention is an eco-friendly process because it may use carbon dioxide, a major cause of global warming, in the synthesis of a transition metal phthalocyanine catalyst-containing porous carbon composite doped with nitrogen atoms having excellent electrochemical properties, starting with carbon dioxide conversion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
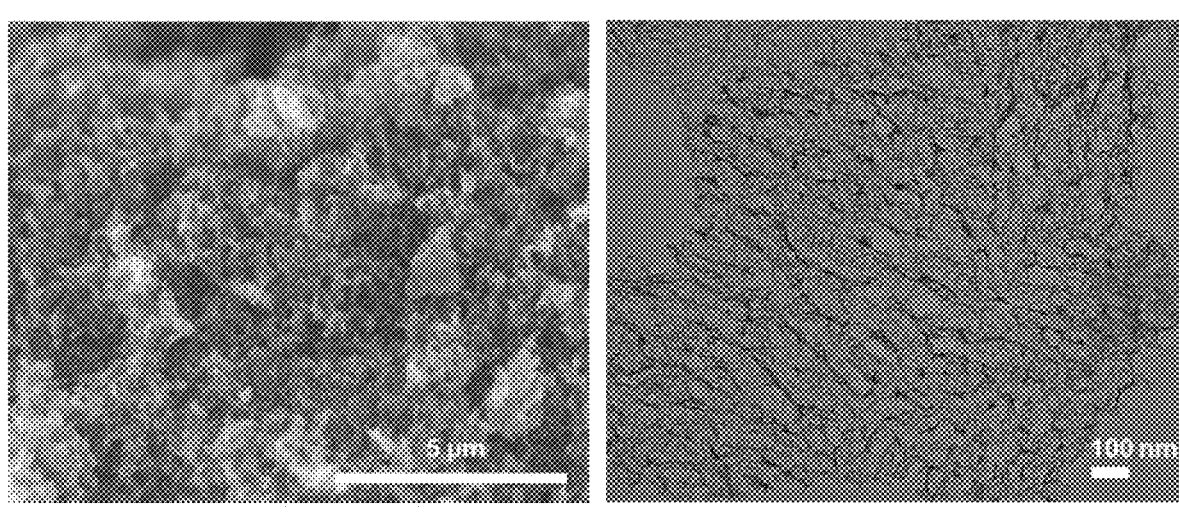
FIG. 1 shows SEM and TEM photographs of an amorphous hierarchical porous carbon material (CPC) obtained in Example 1 of the present invention.

Unless otherwise defined, all technical and scientific terms used in the present specification have the same meanings as commonly understood by those skilled in the art to which the present disclosure pertains. In general, the nomenclature used in the present specification is well known and commonly used in the art.

In the present invention, a porous carbon composite having improved single-metal-atom catalytic active sites has been produced by adding single-atom metal catalysts, which coordinate with nitrogen atoms, to a hierarchical porous carbon material made through the reaction between borohydride and carbon dioxide using nanotemplates, and doping the mixture with nitrogen atoms using an aqueous ammonia solution. In addition, it has been found that, when the porous carbon composite is applied to a lithium-sulfur battery, it exhibits excellent performance. At the same time, porous carbon nanofibers having single-metal-atom catalytic active sites have been produced by adding single-atom metal catalysts, which coordinate with nitrogen atoms, to a hierarchical porous carbon material made through the reaction between borohydride, contained in a polyacrylonitrile solution, and carbon dioxide, and it has been found that, when the porous carbon nanofibers are used as an interlayer for a lithium-sulfur battery, they exhibit excellent performance.

Therefore, in one aspect, the present invention is directed to a method of preparing an amorphous hierarchical porous carbon material having micropores (<2 nm) and mesopores (2 to 50 nm), comprising continuous heat-treating a mixture of a reducing agent and nanotemplates in an inert gas and a carbon dioxide-containing gas at a temperature of 500 to 1,000° C. to obtain a solid product.

In another aspect, the present invention is directed to a method of preparing a porous carbon composite having transition metal catalytic active sites, the method comprises: (a) adding a reducing agent and nanotemplates to a carbon dioxide-containing gas to obtain a mixture, and allowing the mixture to react at a temperature of 500 to 1,000° C., thus obtaining an amorphous hierarchical porous carbon material; and (b) adding a coordination compound of a transition metal and nitrogen to the amorphous hierarchical porous carbon material, followed by heat treatment.

In still another aspect, the present invention is directed to a porous carbon composite having transition metal catalytic active sites, in which the porous carbon composite is produced by the above-described method, contains both micropores (<2 nm) and mesopores (2 to 50 nm), and has a surface area of 700 to 1,000 m²/g and a pore size of 2.0 to 3.5 cm³/g.

In yet another aspect, the present invention is directed to a porous carbon composite having transition metal catalyst active sites, in which the porous carbon composite is produced by the above-described method, contains both micropores (<2 nm) and mesopores (2 to 50 nm), has a surface area of 800 to 1,200 m²/g and a pore size of 2.5 to 4.0 cm³/g, and is doped with nitrogen atoms.

In still yet another aspect, the present invention is directed to a positive electrode for a lithium-sulfur battery comprising the porous carbon composite having transition metal catalytic active sites, the positive electrode having performance of 500 to 1,000 mAh/g when driven at 1.7 to 2.8 V and at 0.5 to 7.0 C.

In a further aspect, the present invention is directed to hierarchical porous carbon nanofibers having transition metal catalytic active sites, wherein the hierarchical porous carbon nanofibers are produced by the above-described method, contain both micropores (<2 nm) and mesopores (2 to 50 nm) and have a surface area of 100 to 300 m²/g and a pore size of 0.1 to 0.4 cm³/g.

In another further aspect, the present invention is directed to an interlayer for a lithium-sulfur battery comprising the hierarchical porous carbon nanofibers having transition metal catalyst active sites, the interlayer having performance of 500 to 1,000 mAh/g when driven at 1.7 to 2.8 V and at 0.5 to 7.0 C.

In still another further aspect, the present invention is directed to a method of preparing hierarchical porous carbon nanofibers having micropores (<2 nm) and mesopores (2 to 50 nm), comprising heat-treating a mixture of polyacrylonitrile and a reducing agent and reacting the heat-treated mixture with a carbon dioxide-containing gas at a temperature of 200 to 1,000° C., thus obtaining a solid product.

In yet another further aspect, the present invention is directed to a method of preparing a hierarchical porous carbon nanofiber composite having transition metal catalytic active sites, the method comprises: (a) allowing a mixture of polyacrylonitrile and a reducing agent to react with a carbon dioxide-containing gas at a temperature of 200 to 1,000° C., thus obtaining hierarchical porous carbon nanofibers; and (b) adding a transition metal phthalocyanine, which is a coordination compound of a transition metal and nitrogen, to the porous carbon nanofibers, followed by heat treatment.

Hereinafter, the present invention will be described in more detail.

The method of preparing an amorphous hierarchical porous carbon material according to the present invention comprises a step of mixing the borohydride reducing agent and nano-sized templates under a moderate pressure, and heat-treating the mixture with carbon dioxide, followed by heat treatment in an inert gas atmosphere (hereinafter, this step will be referred to as reaction step 1). Specifically, the borohydride reducing agent may be mixed with the metal carbonate $CaCO_3$ templates having a size of 15 to 40 nm, and the mixture may be reacted with carbon dioxide at a temperature of 500 to 1,000° C. and heat-treated in an inert argon gas atmosphere.

In the present invention, the method comprises, after step 1, a step of adding a transition metal phthalocyanine, followed by heat treatment and washing (hereinafter, this step will be referred to as step 2 of producing a transition metal phthalocyanine catalyst-containing porous carbon composite).

In addition, the method also comprises a step of doping the solid product, obtained in step 2, with nitrogen atoms through an ammonia solution bubbling technique (hereinafter, this step will be referred to as step 3 of producing a transition metal phthalocyanine catalyst-containing porous carbon composite doped with nitrogen atoms).

The reducing agent that is used in the present invention comprises a magnesium (Mg), magnesium hydride (MgH₂), or borohydride reducing agent. Examples of the borohydride include alkali metal or alkaline earth metal borohydrides, specifically, metal hydrides such as sodium borohydride (NaBH₄), potassium borohydride (KBH₄), calcium borohydride ((Ca(BH₄)₂), strontium borohydride (Sr(BH₄)₂), magnesium borohydride (Mg(BH₄)₂), or lithium borohydride (LiBH₄). In addition, a combination of two or more selected from among the above-listed borohydrides may be used.

The heat treatment process may be performed at an absolute pressure of 0.01 to 50 atm, preferably 0.05 to 5.0 atm.

The heat treatment process may be performed using carbon dioxide gas and argon gas.

The temperature in the initial heat treatment process is preferably 400° C. or higher, and a temperature of 500° C. or higher may be required in order for carbon dioxide to be completely converted into an activated carbon material.

The temperature in the later heat treatment process using argon gas is preferably 500° C. or higher, and a temperature of 600° C. or higher may be required to produce an amorphous hierarchical porous carbon material.

In the heat treatment process, the temperature may be raised at a rate of 1 to 20° C./min, preferably 1 to 10° C./min.

The nanotemplates that are used in the heat treatment process may be an alkali metal, an alkaline earth metal, or a transition metal oxide (metal [I-V] oxide) or carbonate (Metal [I-IV] carbonate). Specifically, the alkali metal may be lithium (Li), sodium (Na) or cesium (Cs), and the alkaline earth metal may be calcium (Ca), magnesium (Mg) or strontium (Sr), and the transition metal may be nickel (Ni), cobalt (Co), copper (Cu), zinc (Zn), titanium (Ti), iron (Fe), or manganese (Mn). In addition, one or a combination of two or more selected from the above list may be used.

The above-mentioned nanotemplates may be one or more selected from among the above-mentioned metal oxides and metal carbonates. Examples of the metal oxide include CaO, MgO, Fe₂O₃, Fe₃O₄, and the like, and examples of the metal carbonate include CaCO₃, Na₂CO₃, NiCO₃, CoCO₃, Li₂CO₃, FeCO₃, and the like. However, the nanotemplates are not limited to these examples, and any type of material including one of more of the above-mentioned metals may be used.

In the step 2 synthesis, the transition metal phthalocyanine is loaded on the amorphous hierarchical porous carbon material using one or more selected from among a spraying method, an evaporation drying method, a simple immersion method, and a precipitation method. Preferably, the simple immersion method is used.

The spraying method is a method of spraying a solution containing a metal precursor onto the carbon material.

The evaporation drying method is a method in which the carbon material is placed in a metal precursor solution and then heated to evaporate the solvent, thus loading the metal on the carbon material.

The simple immersion method is a method of loading the metal into the pores of the carbon material by placing the carbon material in a metal precursor solution.

More specifically, the method may comprise a dispersion step of applying ultrasonic waves to a solution containing the transition metal phthalocyanine and the amorphous hierarchical porous carbon material, before performing the simple immersion method.

In heat treatment of step 2, nitrogen or argon, which is an inert gas, is flowed into the reactor, and the absolute pressure may be 0.05 to 5.0 atm.

The metal precursor for the carbon metal composite may be a transition metal or a noble metal. Specifically, the transition metal may be nickel (Ni), cobalt (Co), copper (Cu), zinc (Zn), titanium (Ti), iron (Fe), or manganese (Mn), and the noble metal may be gold (Au), platinum (Pt), or silver (Ag). In addition, one or a combination of two or more selected from the above list may be used.

Examples of the above-mentioned metal precursor include transition metal phthalocyanines in which nitrogen atoms of phthalocyanine ($C_{32}H_{18}N_8$) coordinate with single transition metal atoms. Specifically, the metal precursor may be at least one selected from the group consisting of titanium (Ti) phthalocyanine, copper (Cu) phthalocyanine, nickel (Ni) phthalocyanine, molybdenum (Mo) phthalocyanine, manganese (Mn) phthalocyanine, cobalt (Co) phthalocyanine, iron (Fe) phthalocyanine, and zinc (Zn) phthalocyanine.

The above-mentioned transition metal phthalocyanine may be used in an amount of 1 to 100 wt % based on the produced hierarchical porous carbon material, and the degree of metal loading in the final product is determined depending on the amount of transition metal phthalocyanine used.

In step 2, the heat treatment process may be performed at an absolute pressure of 0.05 to 5.0 atm while flowing the inert gas argon or nitrogen.

In the heat treatment step, the temperature may be raised at a rate of 1 to 20° C./min, preferably 1 to 10° C./min.

The heat treatment step may be performed at a temperature of 500 to 600° C. or higher, preferably 700° C. or higher, more preferably 500 to 1,000° C. At a temperature exceeding 1,000° C., the phthalocyanine precursor may be changed rapidly.

In order to remove agglomerated crystalline metal particles that may be included in the process of synthesizing the transition metal phthalocyanine catalyst-containing porous carbon composite according to the present invention, washing may be performed using an acid, hot water, cold water, or alcohol.

Specifically, the acid may be hydrochloric acid, sulfuric acid, etc., and the alcohol may be methanol, ethanol, etc. The washing temperature may be 25 to 100° C.

The metal-loaded carbon material washed by the above process is dried at an absolute pressure of 0 to 1 atm and a temperature of 80 to 120° C. until the liquid is completely removed.

Step 3 comprises doping nitrogen atoms into the carbon material obtained in steps 1 and 2.

The nitrogen precursor may be at least one selected from the group consisting of polyacrylonitrile (PAN), polypyrrole, polyaniline, sodium azide ($NaN_3$), hydrazine ($N_2H_4$), ammonia borane ($NH_3BH_3$), melamine ($C_3H_6N_6$), PDI (N,N'-bis(2,6-diisopropyphenyl)-3,4,9,10-perylenetetracarboxylicdiimide), urea ($CO(NH_2)_2$), and ammonia ($NH_3$) gas.

In the present invention, nitrogen atom doping may be performed through aqueous ammonia solution bubbling. While the direct use of ammonia gas to dope nitrogen atoms is very dangerous, a method of performing nitrogen atom doping by the indirect use of an aqueous ammonia solution is relatively safe. In addition, the composite produced through this process has significantly improved porous properties and also has significantly improved electrochemical properties. Therefore, the composite produced in an efficient and environmentally friendly manner according to the present invention is a material that may be easily applied to a high energy storage device such as a lithium-sulfur battery.

Methods of treating the carbon material with ammonia gas among the nitrogen precursors include a direct method of performing heat treatment while flowing ammonia gas directly into the reactor, and an indirect treatment method of performing heat treatment while flowing ammonia gas, generated by bubbling an aqueous ammonia solution with an inert carrier gas, into the reactor.

The inert carrier gas for the ammonia solution bubbling process for indirect ammonia gas treatment may be at least one selected from among nitrogen and argon.

In the ammonia solution bubbling process, the inert gas flow rate required to bubble the aqueous ammonia solution may be 30 to 180 ml/min.

Ammonia treatment in the ammonia solution bubbling process may be performed at a temperature of 500 to 1,000° C., preferably 500 to 600° C. or higher, more preferably 700° C. or higher.

In the ammonia aqueous solution bubbling process, the ammonia treatment time may be 15 to 120 minutes.

The ammonia solution bubbling process may comprise, before ammonia treatment, heat treatment with the inert gas at an absolute pressure of 0.05 to 5.0 atm in the temperature rising process.

Through the ammonia solution bubbling process, the nitrogen atom percentage may increase from 1-2 at % to 4-7 at %, and the nitrogen atom content may increase from 0.5-2.0 wt % to 3.0-6.0 wt %.

In the heat treatment step, the temperature may be raised at a rate of 1 to 20° C./min, preferably 1 to 10° C./min.

Meanwhile, the method of preparing hierarchical porous carbon nanofibers according to the present invention comprises a step of mixing the borohydride reducing agent and polyacrylonitrile under a moderate pressure and allowing the mixture to react with carbon dioxide, followed by heat treatment in an inert gas atmosphere (hereinafter, this step will be referred to as step 1 of reaction). Specifically, the mixture may be reacted with carbon dioxide at a temperature of 200 to 1,000° C. and heat-treated in an inert gas (argon) atmosphere.

In the present invention, the method comprises, after step 1, a step of adding a transition metal phthalocyanine, followed by heat treatment and washing (hereinafter, this step will be referred to as step 2 of producing a transition metal phthalocyanine catalyst-containing hierarchical porous carbon nanofibers).

The reducing agent that is used in the present invention comprises a magnesium (Mg), magnesium hydride ($MgH_2$) or borohydride reducing agent. Examples of the borohydride include alkali metal or alkaline earth metal borohydrides, specifically, metal hydrides such as sodium borohydride ($NaBH_4$), potassium borohydride ($KBH_4$), calcium borohydride (($Ca(BH_4)_2$), strontium borohydride ($Sr(BH_4)_2$), magnesium borohydride ($Mg(BH_4)_2$), or lithium borohydride ($LiBH_4$). In addition, a combination of two or more selected from among the above-listed borohydrides may be used.

The heat treatment process may be performed at an absolute pressure of 0.01 to 50 atm, preferably 0.05 to 5.0 atm.

The heat treatment process may be performed using carbon dioxide gas and argon gas.

The temperature in the initial heat treatment process using argon gas is preferably 100° C. or higher, and a temperature of 200° C. or higher may be required to produce the amorphous hierarchical porous carbon nanofibers.

The temperature in the later heat treatment process is preferably 400° C. or higher, and a temperature of 500° C. or higher may be required for carbon dioxide to be completely converted into activated carbon nanofibers.

In the heat treatment process, the temperature may be raised at a rate of 1 to 20° C./min, preferably 1 to 10° C./min.

In the step-2 synthesis, the transition metal phthalocyanine is loaded on the amorphous hierarchical porous carbon nanofibers using one or more selected from among a spraying method, an evaporation drying method, a simple immersion method, and a precipitation method. Preferably, the simple immersion method is used.

The spraying method is a method of spraying a solution containing a metal precursor onto the carbon nanofibers.

The evaporation drying method is a method in which the carbon nanofibers are placed in a metal precursor solution and then heated to evaporate the solvent, thus loading the metal on the carbon nanofibers.

The simple immersion method is a method of loading the metal into the pores of the carbon nanofibers by placing the carbon nanofibers in a metal precursor solution.

In heat treatment of step 2, nitrogen or argon, which is an inert gas, is flowed into the reactor, and the absolute pressure may be 0.05 to 5.0 atm.

The metal precursor for the carbon nanofiber/metal composite may be a transition metal or a noble metal. Specifically, the transition metal may be nickel (Ni), cobalt (Co), copper (Cu), zinc (Zn), titanium (Ti), iron (Fe), or manganese (Mn), and the noble metal may be gold (Au), platinum (Pt), or silver (Ag). In addition, one or a combination of two or more selected from the above list may be used.

Examples of the above-mentioned metal precursor include transition metal phthalocyanines in which nitrogen atoms of phthalocyanine ($C_{32}H_{18}N_8$) coordinate with single transition metal atoms. Specifically, the metal precursor may be at least one selected from the group consisting of titanium (Ti) phthalocyanine, copper (Cu) phthalocyanine, nickel (Ni) phthalocyanine, molybdenum (Mo) phthalocyanine, manganese (Mn) phthalocyanine, cobalt (Co) phthalocyanine, iron (Fe) phthalocyanine, and zinc (Zn) phthalocyanine.

The above-mentioned transition metal phthalocyanine may be used in an amount of 1 to 100 wt % based on the produced hierarchical porous carbon material, and the degree of metal loading in the final product is determined depending on the amount of transition metal phthalocyanine used.

In step 2, the heat treatment process may be performed at an absolute pressure of 0.05 to 5.0 atm while flowing the inert gas argon or nitrogen.

In the heat treatment step, the temperature may be raised at a rate of 1 to 20° C./min, preferably 1 to 10° C./min.

The heat treatment step may be performed at a temperature of 500 to 600° C. or higher, preferably 700° C. or higher, more preferably 500 to 1,000° C. At a temperature exceeding 1,000° C., the phthalocyanine precursor may be changed rapidly.

In order to remove agglomerated crystalline metal particles that may be included in the process of synthesizing the transition metal phthalocyanine catalyst-containing porous carbon nanofiber composite according to the present invention, washing may be performed using an acid, hot water, cold water, or alcohol.

Specifically, the acid may be hydrochloric acid, sulfuric acid, etc., and the alcohol may be methanol, ethanol, etc. The washing temperature may be 25 to 100° C.

The metal-loaded carbon material washed by the above process is dried at an absolute pressure of 0 to 1 atm and a temperature of 80 to 120° C. until the liquid is completely removed.

Hereinafter, the present invention will be described in more detail with reference to examples to aid in understanding of the present invention. However, the following examples are only illustrative of the present invention, and those skilled in the art will appreciate that various changes and modifications are possible without departing from the scope and spirit of the present invention, and also fall within the scope of the appended claims.

EXAMPLES

Example 1: Production of Amorphous Hierarchical Porous Carbon Material (CPC) by Carbon Dioxide Treatment Using Nano-Templates A method of producing a hierarchical porous carbon material from carbon dioxide after physical mixing of a borohydride reducing agent and nanotemplates will be described in detail below.

4 g of sodium borohydride ($NaBH_4$, >96%, Sigma-Aldrich) among the above-mentioned borohydrides and 6 g of calcium carbonate ($CaCO_3$) among the above-mentioned nanotemplates were physically mixed together for 45 minutes. Next, the mixture was placed in an alumina crucible which was then placed in a reactor (furnace). The reactor was purged by flowing carbon dioxide ($CO_2$, >99.99%, Sam-O Gas Co.) at a rate of 75 mL/min for 30 minutes. Next, the temperature of the reactor was raised from 25° C. to 500° C. at 5° C./min and maintained at 500° C. for 2 hours. Next, the temperature of the reactor was raised to 600° C. at a rate of 5° C./min in the presence of carbon dioxide, and then the carbon dioxide gas flow was turned off, and argon gas (Ar, >99.999%, Sam-O Gas Co.) was flowed into the reactor at a rate of 60 mL/min. Next, the temperature was further raised to 700° C. at 5° C./min and maintained at 700° C. for 2 hours. After the reactor was cooled, the resulting material was washed with 5M hydrochloric acid, hot water, cold water, and ethanol until reaching a neutral pH in order to remove salt and nanotemplates from the produced hierarchical porous carbon material, and the precipitate was dried in an oven at 100° C. at 1 atm for 24 hours. In this case, the synthesized material was a hierarchical porous carbon derived from carbon dioxide ($CO_2$), and thus was named $CO_2$-derived porous carbon (CPC).

FIG. 1 shows SEM and TEM photographs of the amorphous hierarchical porous carbon material (CPC) produced in Example 1 by physically mixing calcium carbonate and borohydride and then treating the mixture with atmospheric pressure carbon dioxide at 500° C., followed by heat treatment at 700° C. in an argon gas atmosphere.

As shown in the SEM photograph, many pores were formed on the outer surface of the carbon material due to the calcium carbonate templates. In addition, as shown in the TEM photograph, it can be confirmed that many pores were formed inside the produced carbon material due to the templates.

Example 2: Process for Production of Transition Metal Phthalocyanine Catalyst-Containing Porous Carbon Composite CPC/FePC Fe-phthalocyanine (>99%, Sigma-Aldrich) was added to the CPC produced by the method of Example 1 using a simple immersion method. Thereafter, a metal catalyst-containing a hierarchical porous carbon composite was produced by a heat-treatment process in an argon gas atmosphere. This production method will be described in detail below.

0.2 g of the CPC of Example 1 above was immersed in a solution containing 0.01 g of Fe phthalocyanine, which has been dispersed in 50 ml of ethanol by applying ultrasonic waves for 1 hour, and was subjected to an additional ultrasonication process for 1 hour. Next, the mixture was stirred at 400 rpm for 12 hours. After stirring, the CPC/Fe-phthalocyanine mixture was dried in an oven at 100° C. at 1 atm for 24 hours.

The dried CPC/Fe-phthalocyanine mixture was placed in an alumina crucible which was then placed in a reactor (furnace). The reactor was purged by flowing argon gas (Ar, >99.99%, Sam-O Gas Co.) at a rate of 60 mL/min for 30 minutes. Next, the temperature of the reactor was raised from 25° C. to 700° C. at a rate of 5° C./min and maintained at 700° C. for 1 hour. After the reactor was cooled, the produced carbon-Fe metal composite was recovered.

In order to remove aggregated Fe metal-based by-products from the carbon-Fe metal composite recovered through the above process, treatment with 1M hydrochloric acid was performed for 4 hours. Next, the resulting material was washed with distilled water and ethanol until a neutral pH was reached, and the precipitate was dried in an oven at 100° C. at 1 atm for 24 hours. In this case, the synthesized material was composed of $CO_2$-derived porous carbon (CPC), which is an amorphous hierarchical porous carbon derived from carbon dioxide, and Fe-phthalocyanine, and thus the Fe phthalocyanine catalyst-containing porous carbon composite was named CPC/FePC.

Figure 2:
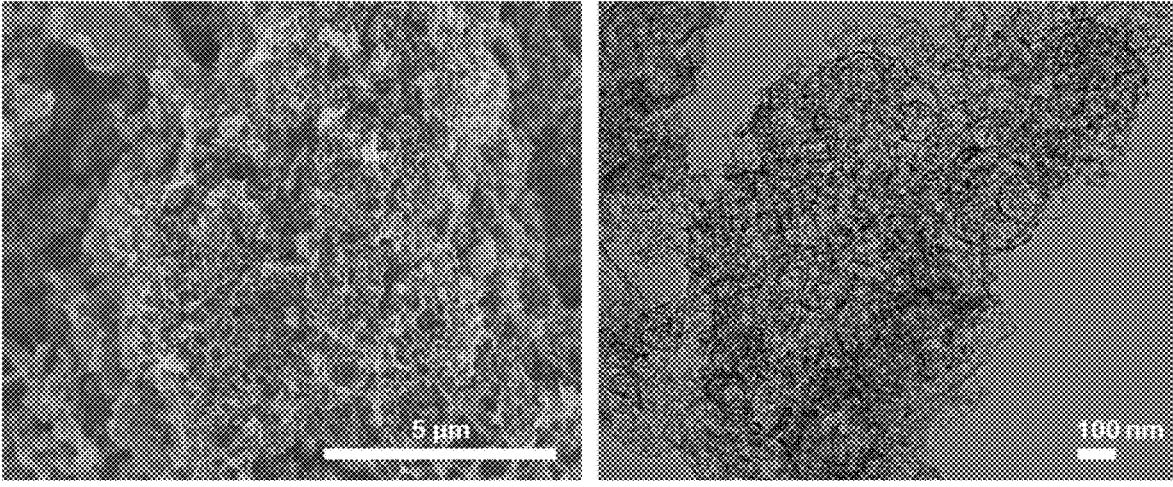
FIG. 2 shows SEM and TEM photographs of a transition metal phthalocyanine catalyst-containing porous carbon composite (CPC/FePC) obtained in Example 2 of the present invention.

FIG. 2 shows SEM and TEM photographs of the transition metal phthalocyanine catalyst-containing porous carbon composite (CPC/FePC) obtained by adding Fe phthalocyanine to the hierarchical porous carbon of Example 1 using a simple immersion method, followed by heat treatment and washing. Referring to the SEM and TEM photographs, it is confirmed that, even after Fe phthalocyanine was added, aggregated particles were not observed on the outer surface and inside of the porous carbon composite, and the porous structure was maintained.

Example 3: Transition Metal Phthalocyanine Catalyst-Containing Porous Carbon Composite (TAB CPC/FePC) Doped with Nitrogen Atoms by Nitrogen Doping Using Aqueous Ammonia Solution A transition metal phthalocyanine catalyst-containing porous carbon composite was synthesized by doping the CPC/FePC, produced in Example 2, with nitrogen atoms using ammonia gas, generated through bubbling of an aqueous ammonia solution ($NH_4OH$, >25%, Samchun), and using heat treatment. A method of preparing this composite will be described in detail below.

The CPC/FePC of Example 2 above was placed in an alumina crucible which was then placed in a reactor (furnace). The reactor was purged with argon gas (Ar, >99.999%, Sam-O Gas Co.) at a rate of 60 mL/min for 30 minutes. Next, the temperature of the reactor was raised from 25° C. to 700° C. at a rate of 5° C./min under an argon atmosphere.

Before reaching 700° C., an aqueous ammonia solution was placed in a chamber having both an inlet portion, into which the carrier gas argon can enter to form bubbles of an aqueous ammonia solution, and an outlet portion through which ammonia gas generated by bubbling of the carrier gas can continuously enter the reactor (furnace). Upon reaching 700° C., the argon line through which argon flowed at a rate of 30 to 120 ml/min was connected to the inlet portion of the chamber containing the aqueous ammonia solution, and the outlet portion of the chamber was connected to the reactor.

After the above process was maintained at about 700° C., argon gas was flowed again into the reactor at a rate of 60 ml/min until the reactor cooled. In this case, since doping of the CPC/FePC of Example 2 with nitrogen atoms was performed by "treated with ammonia solution bubbling technique", the synthesized Fe phthalocyanine catalyst-containing porous carbon composite was named TAB CPC/FePC.

Figure 3:
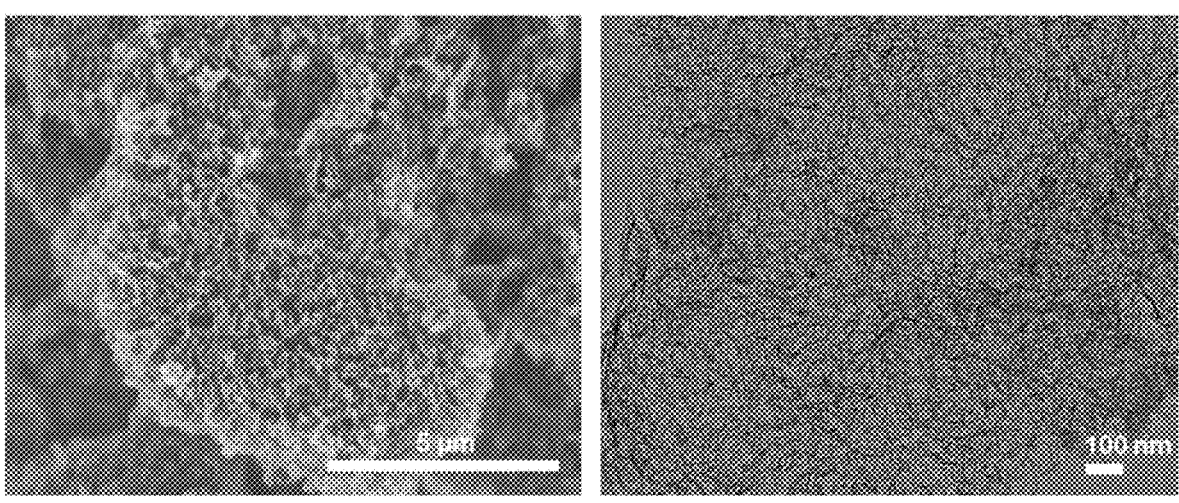
FIG. 3 shows SEM and TEM photographs of a transition metal phthalocyanine catalyst-containing porous carbon composite (TAB CPC/FePC) doped with nitrogen atoms, obtained in Example 3 of the present invention.

FIG. 3 shows SEM and TEM photographs of the Fe phthalocyanine catalyst-containing porous carbon composite obtained by doping the CPC/FePC of Example 2 with nitrogen atoms by the ammonia solution bubbling technique. Referring to the SEM and TEM photographs of the carbon material produced in the above Example, a significant difference in the structure of the TAB CPC/FePC from those of the materials produced in Examples 1 and 2 was not observed. That is, it can be interpreted that the nitrogen atom doping method using aqueous ammonia solution does not significantly affect the basic morphological characteristics of the existing carbon materials.

Figure 4:
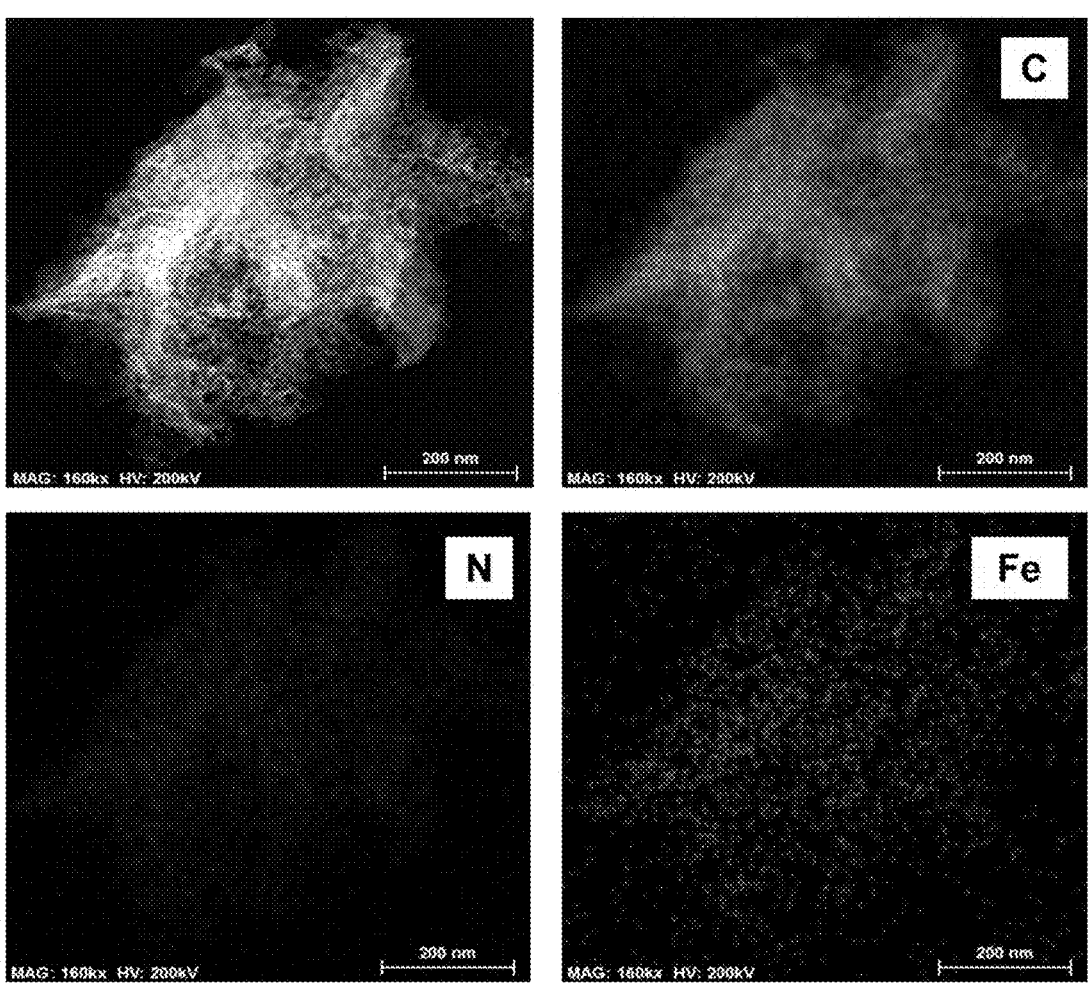
FIG. 4 shows STEM elemental mapping photographs of the composite obtained in Example 3 of the present invention.

FIG. 4 shows STEM elemental mapping images of the hierarchical porous carbon composite containing single-atom metal catalysts and doped with nitrogen atoms, synthesized in Example 3. Referring to STEM elemental mapping images, it can be confirmed that nitrogen atoms and Fe atoms are uniformly dispersed in the porous carbon material. Therefore, it can be interpreted that, because of the excellent hierarchical porosity, uniform distribution of the catalyst is possible simply by immersion and heat treatment.

Figure 5:
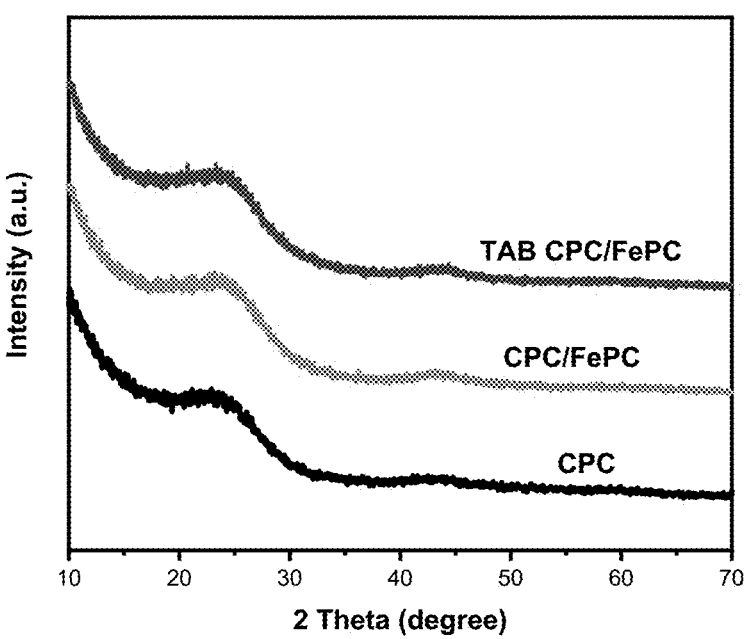
FIG. 5 shows the results of XRD analysis of the materials obtained in Examples 1, 2 and 3 of the present invention.

FIG. 5 is a graph showing the XRD patterns of the materials produced in Examples 1, 2, and 3. In the XRD results of the carbon material to which Fe phthalocyanine was not added, no clear peak was observed, suggesting that the synthesized carbon material is an amorphous material. In addition, even in the case of the material to which Fe phthalocyanine was added, no peak was observed, suggesting that no crystalline metal material was formed after addition of the metal catalyst and washing. Considering all the SEM, TEM, and XRD images, it can be seen that the Fe metal existed as single atoms rather than being agglomerated to form a crystal.

Figure 6:
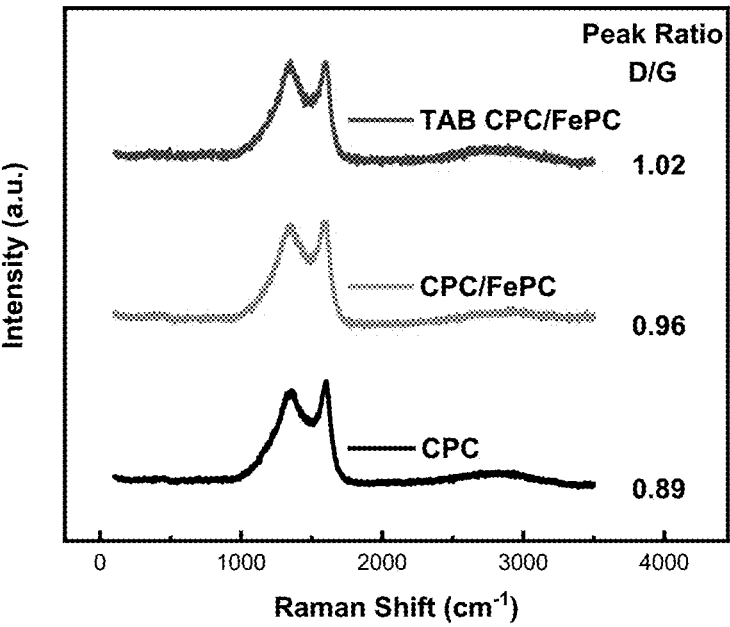
FIG. 6 shows the results of Raman analysis of the materials obtained in Examples 1, 2 and 3 of the present invention.

FIG. 6 shows the results of Raman analysis of the materials produced in Examples 1, 2 and 3. It was confirmed that, when Fe phthalocyanine was added to the existing porous carbon material, the Fe atoms in phthalocyanine and nitrogen atoms were doped into the porous carbon structure, resulting in an increase in the $I_D/I_G$ ratio. In addition, when additional nitrogen atom doping was attempted through the ammonia solution bubbling technique, the $I_D/I_G$ ratio increased, and this result suggests that nitrogen atoms were successfully doped through the aqueous ammonia solution bubbling process.

Figure 7:
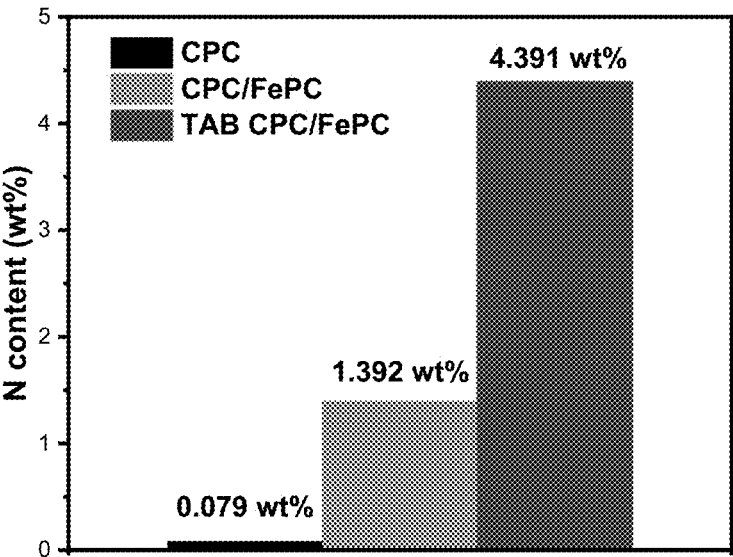
FIG. 7 shows the results of elemental analysis (EA) of the materials obtained in Examples 1, 2 and 3 of the present invention.

FIG. 7 shows the results of analyzing the nitrogen atom contents of the materials produced in Examples 1, 2, and 3. The nitrogen atom content in the Fe phthalocyanine-containing composite (CPC/FePC) clearly increased compared to that in the amorphous porous carbon material (CPC) containing no Fe phthalocyanine, indicating that nitrogen atoms together with the Fe atoms present in the Fe phthalocyanine were added. In addition, the nitrogen content increased more than three-fold (from 1.392 wt % to 4.391 wt %) after the additional nitrogen atom doping attempt using the aqueous ammonia solution. This suggests that the $I_D/I_G$ ratio that increased in FIG. 6 is due to the nitrogen atoms doped through the aqueous ammonia solution bubbling process, and that the method of treating the composite material through bubbling of the aqueous ammonia solution is an effective method for nitrogen atom doping.

Figure 8:
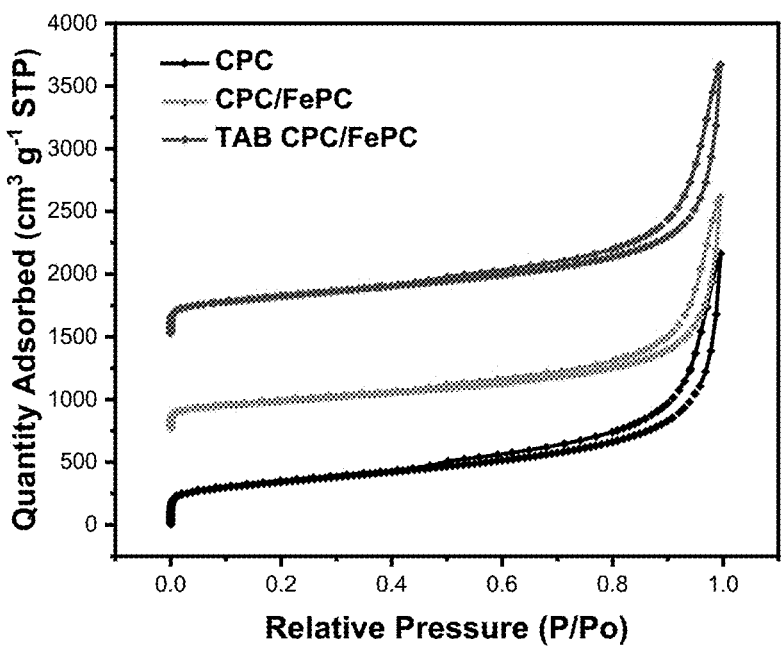
FIG. 8 is a graph showing nitrogen adsorption isotherm curves of the materials obtained in Examples 1, 2 and 3 of the present invention.

FIG. 8 shows the results of BET analysis result of the materials produced in Examples 1, 2, and 3. The hierarchical porous carbon to which Fe phthalocyanine was not added had a surface area of 1,216 $m^2$/g and a pore size of 3.355 $cm^3$/g, and the composite to which the catalyst was added had a reduced surface area of 856 $m^2$/g and a pore size of 2.902 $cm^3$/g. In addition, the carbon material doped with nitrogen atoms through the aqueous ammonia solution had a surface area of 1,049 $m^2$/g and a pore size of 3.364 $cm^3$/g, which is an increase compared to those before treatment. Thus, treatment by bubbling of the aqueous ammonia solution contributes not only to increases in the surface area and pore size, but also to the nitrogen atom doping effect.

Figure 9:
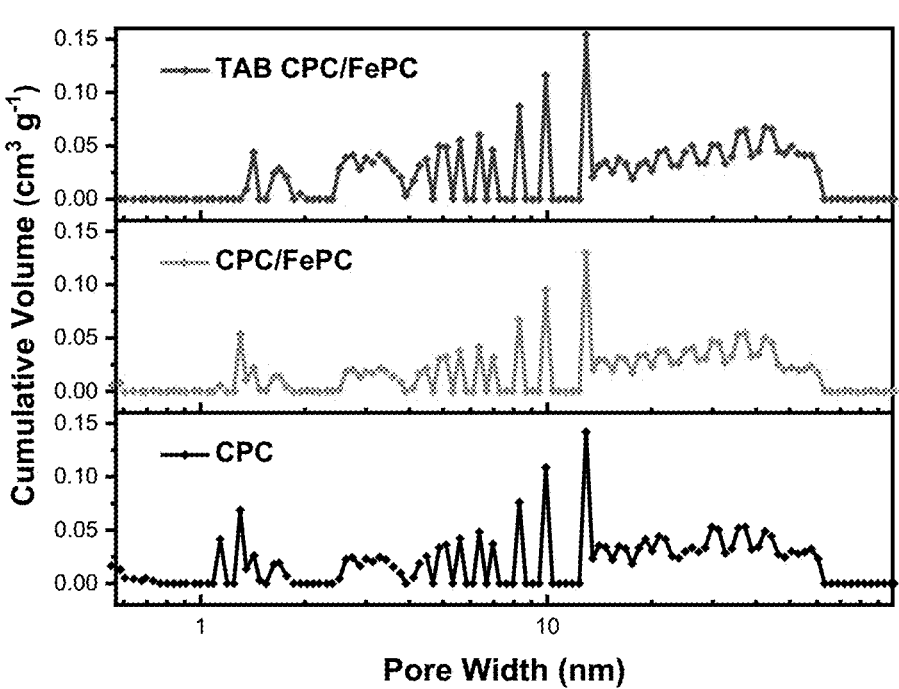
FIG. 9 is a graph showing the pore size distributions of the materials obtained in Examples 1, 2 and 3 of the present invention.

FIG. 9 shows the pore size distributions of the materials produced in Examples 1, 2, and 3. Referring to the pore size distributions shown in in all the materials, it can be seen that a micropore (<2 nm) region and a mesopore (50 nm>pore size>2 nm) coexisted. Therefore, it can be interpreted that all of the synthesized materials had hierarchical porous characteristics.

Figure 10:
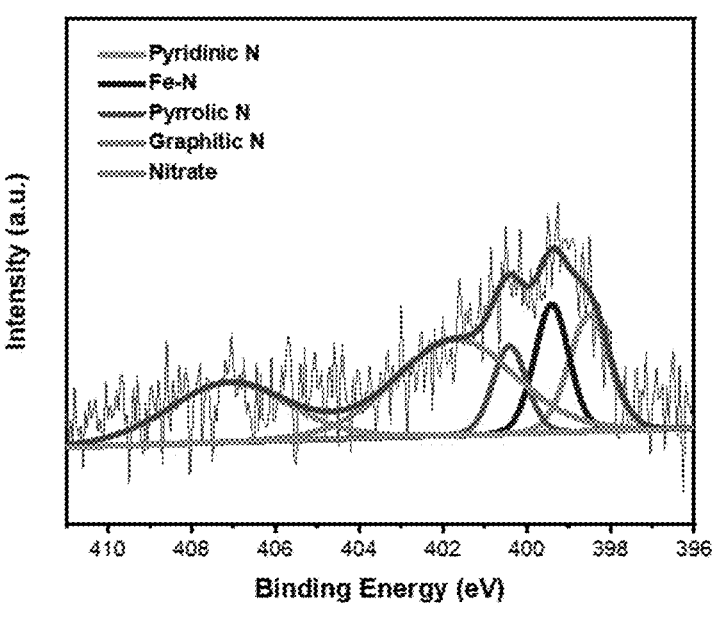
FIG. 10 shows the XPS spectra of nitrogen atoms in the materials obtained in Examples 2 and 3 of the present invention.
Figure 10:
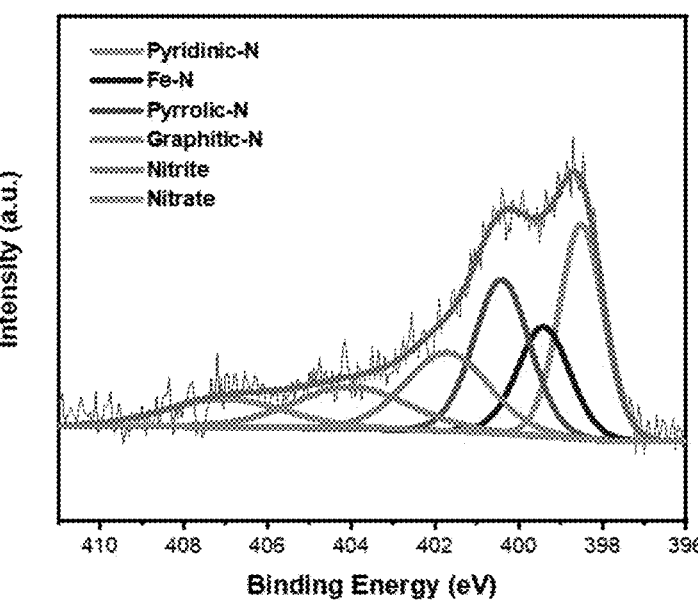

FIG. 10 shows the results of XPS analysis of nitrogen atoms in the materials produced in Examples 2 and 3. The composite (CPC/FePC) not subjected to nitrogen doping through the aqueous ammonia solution had a nitrogen percentage of only 1.53 at %, whereas the composite (TAB CPC/FePC) had a nitrogen percentage of 5.28 at %, which was tripled. Thereamong, pyridinic N in the composite (TAB CPC/FePC), which forms a strong chemical bond with a sulfur-based material, increased from 0.24 at % to 1.30 at %, and the proportion of Fe—N, which contributes to rapid conversion of sulfide, increased from 0.22 at % to 0.78 at %. Therefore, the nitrogen doping method by the ammonia solution bubbling technique can be interpreted as an effective method.

Figure 11:
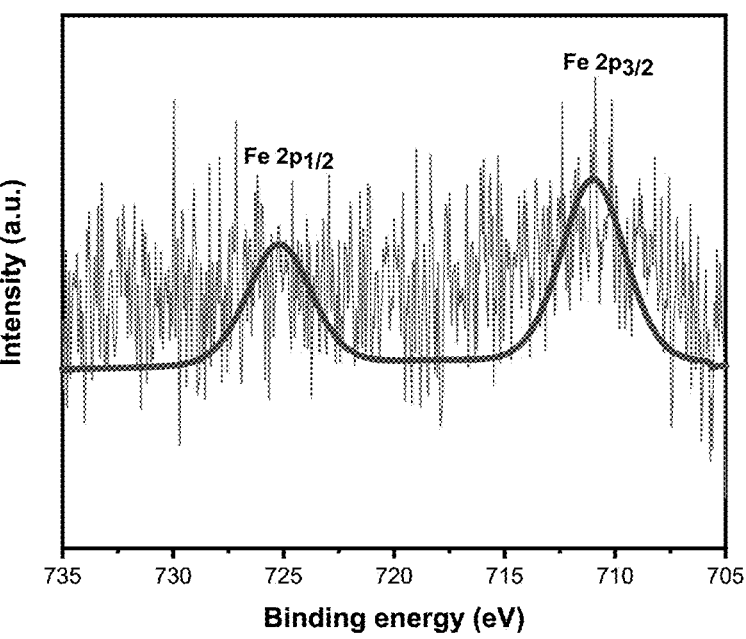
FIG. 11 shows the XPS spectra of iron atoms in the material obtained in Example 3 of the present invention.

FIG. 11 shows the results of XPS analysis of Fe atoms in the material produced in Example 3. Peaks at 710 and 725 eV appeared, suggesting that Fe atoms present in the TAB CPC/FePC do not aggregate to form crystals, but coordinate with nitrogen atoms. Therefore, based on the SEM, TEM, XRD and XPS analyses, it can be interpreted that Fe atoms in the synthesized composite exist as single atoms on the surface of the carbon material.

Example 4: Electrochemical Measurement

Each of the materials synthesized in Examples 1, 2 and 3 was applied as a positive electrode for a lithium-sulfur battery, and the electrochemical properties thereof were examined. Specific performance thereof will be described below.

Figure 12:
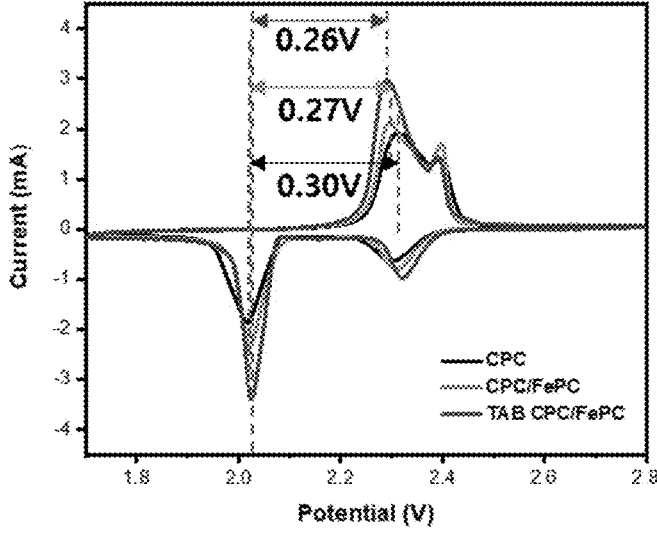
FIG. 12 is a graph showing the results of cyclic voltammetry (CV) performed at a rate of 0.1 mV/s by applying each of the materials, obtained in Examples 1, 2 and 3 of the present invention, to a lithium-sulfur battery.

FIG. 12 shows the CV results obtained at a voltage scan rate of 0.1 mV/s within a voltage range of 1.7 to 2.8V by using each of the materials, produced in Examples 1, 2, and 3, as a positive electrode for a lithium-sulfur battery. In the case of the carbon material to which the catalyst was not added, the difference in voltages related to oxidation and reduction reactions was the largest. In addition, when the catalyst was added, the voltage difference decreased, because the catalyst uniformly distributed in the carbon material reduced the overvoltage by promoting the sulfide conversion reaction. In addition, in the case of the composite treated with the aqueous ammonia solution, as confirmed by the XPS analysis, the densities of Fe and nitrogen coordinating with each other further increased, and thus it can be interpreted that the electrochemical performance of the composite was improved due to the increased catalyst density.

Figure 13:
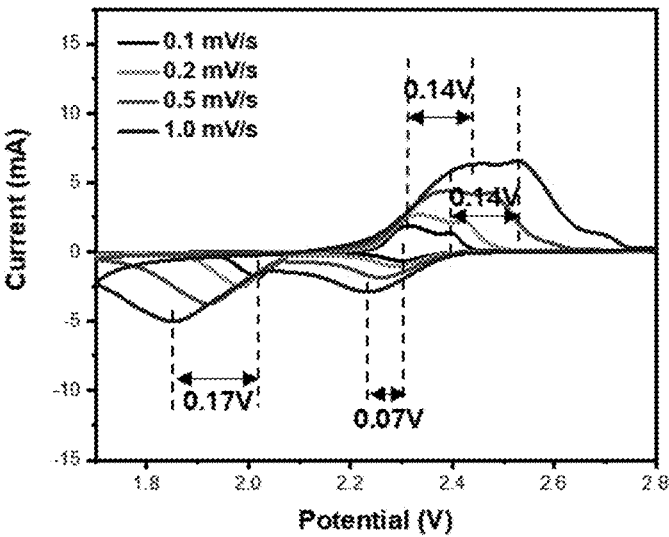
FIG. 13 is a graph showing the results of cyclic voltammetry (CV) performed at different voltage scan rates by applying the material CPC, obtained in Example 1 of the present invention, to a lithium-sulfur battery.

FIG. 13 shows the CV results obtained by applying the hierarchical porous carbon material, produced in Example 1, to a lithium-sulfur battery and changing the voltage at different voltage scan rates within the range of 1.7 to 2.8V. As the scan rate increased, the shift of the peak due to overvoltage became greater.

Figure 14:
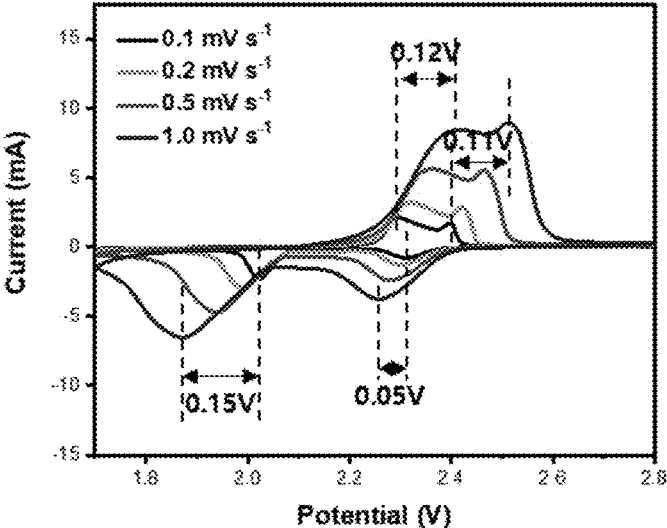
FIG. 14 is a graph showing the results of cyclic voltammetry (CV) performed at different voltage scan rates by applying the material CPC/FePC, obtained in Example 2 of the present invention, to a lithium-sulfur battery.
Figure 15:
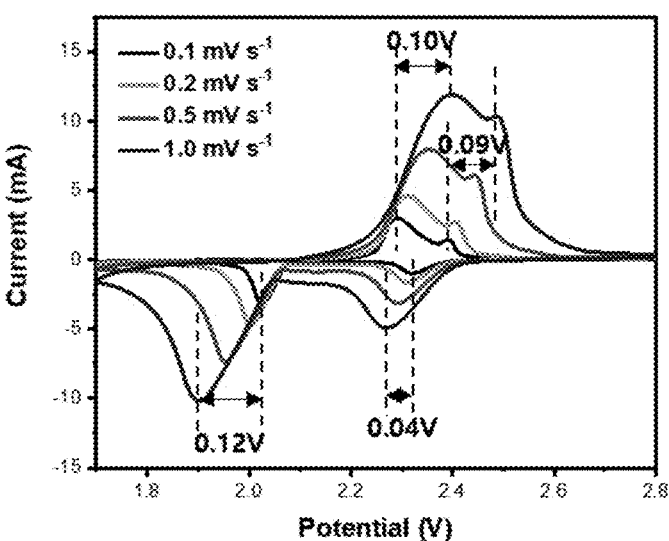
FIG. 15 is a graph showing the results of cyclic voltammetry (CV) performed at different voltage scan rates by applying the material TAB CPC/FePC, obtained in Example 2 of the present invention, to a lithium-sulfur battery.

FIG. 14 shows the CV results obtained by applying the composite, produced in Example 2, to a lithium-sulfur battery and changing the voltage at different voltage scan rates within the range of 1.7 to 2.8V. As the scan rate increased, a larger overvoltage occurred, which resulted in shift of the peak. However, compared to the carbon material (CPC) produced in Example 1, the overvoltage decreased, and the amount of current generated by the voltage change also increased. This is because the single-atom Fe metal catalysts that coordinate with the nitrogen atoms uniformly distributed in the carbon material promoted the oxidation and reduction reactions of lithium sulfide.

FIG. 14 shows the CV results obtained by applying the composite, produced in Example 3, to a lithium-sulfur battery and changing the voltage at different voltage scan rates within the range of 1.7 to 2.8 V. Compared to the materials produced in Examples 1 and 2, the overvoltage decreased and the amount of current generated was also the highest. This is believed to be because the nitrogen atoms added through the ammonia solution bubbling technique improved the conductivity of the complex TAB CPC/FePC, and at the same time, increased the density of the Fe atoms coordinating with the nitrogen atoms, thereby further improving the reaction kinetics.

Figure 16:
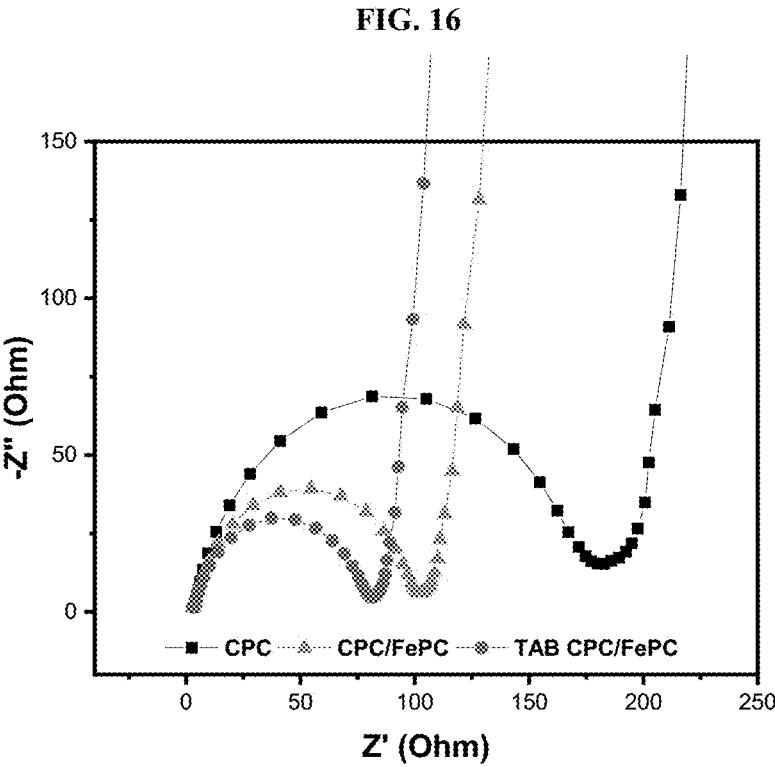
FIG. 16 is a graph showing the results of electrochemical impedance spectroscopy (EIS) performed by applying each of the materials, obtained in Examples 1, 2 and 3 of the present invention, to a lithium-sulfur battery.

FIG. 16 shows the results of electrochemical impedance spectroscopy (EIS) performed by applying each of the materials, produced in Examples 1, 2 and 3, to a lithium-sulfur battery. Referring to FIG. 16, in the case of the composite containing the catalyst, the resistance caused by the transfer of charges decreased, and the TAB CPC/FePC treated with the ammonia solution had a smaller resistance characteristic due to the increase in the density of the catalytically active sites.

Figure 17:
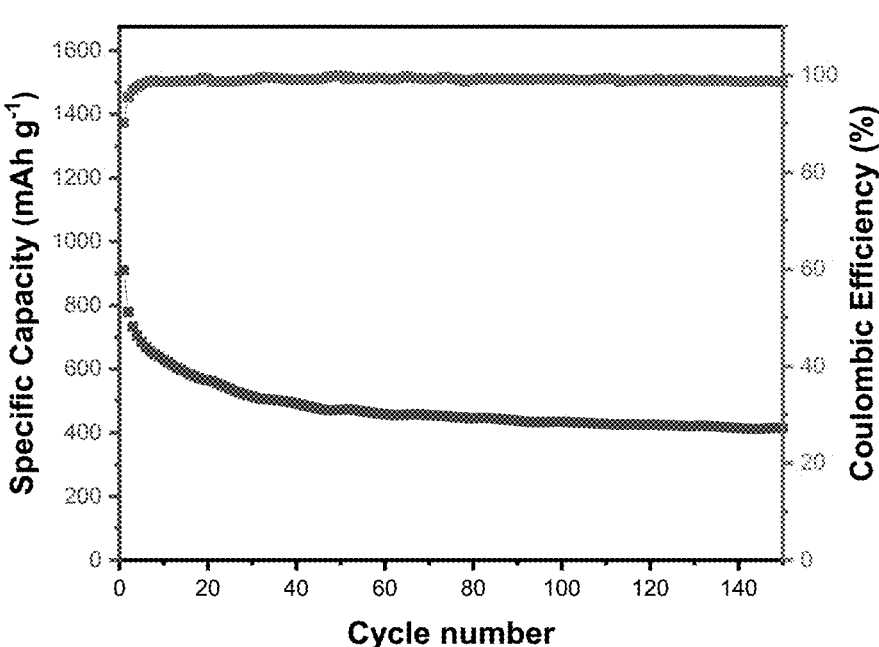
FIG. 17 is a graph showing the results of charge/discharge cycles performed at 0.5 C by applying the material, obtained in Example 1 of the present invention, to a lithium-sulfur battery.

FIG. 17 is a graph showing the results of cycling performed by applying the hierarchical porous carbon material, produced in Example 1, to a lithium-sulfur battery. As can be seen from the graph, when driven at a rate of 0.5 C, the hierarchical porous carbon material delivered a discharge capacity of 421 mAh/g in the $150^{th}$ cycle.

Figure 18:
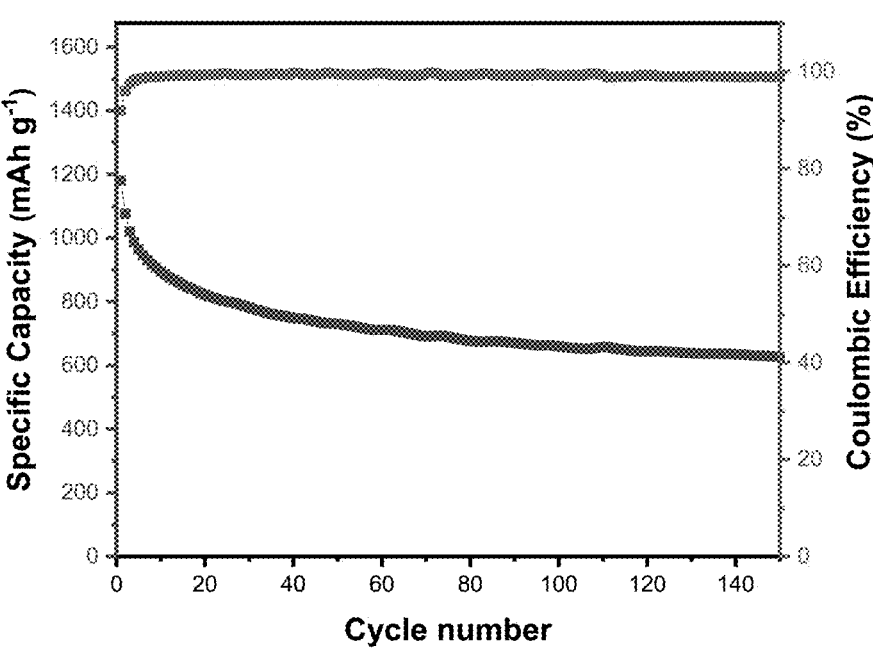
FIG. 18 is a graph showing the results of charge/discharge cycles performed at 0.5 C by applying the material CPC/FePC, obtained in Example 2 of the present invention, to a lithium-sulfur battery.

FIG. 18 is a graph showing the results of cycling performed by applying the CPC/FePC, produced in Example 2, to a lithium-sulfur battery. As can be seen from the graph, when driven at a rate of 0.5 C, the CPC/FePC delivered a discharge capacity of 625 mAh/g in the $150^{th}$ cycle. The single-atom Fe metal catalysts coordinating with nitrogen atoms caused quick reactions, reducing the active material released by the shuttle phenomenon of lithium sulfide, and thus the CPC/FePC had a higher capacity than the CPC.

Figure 19:
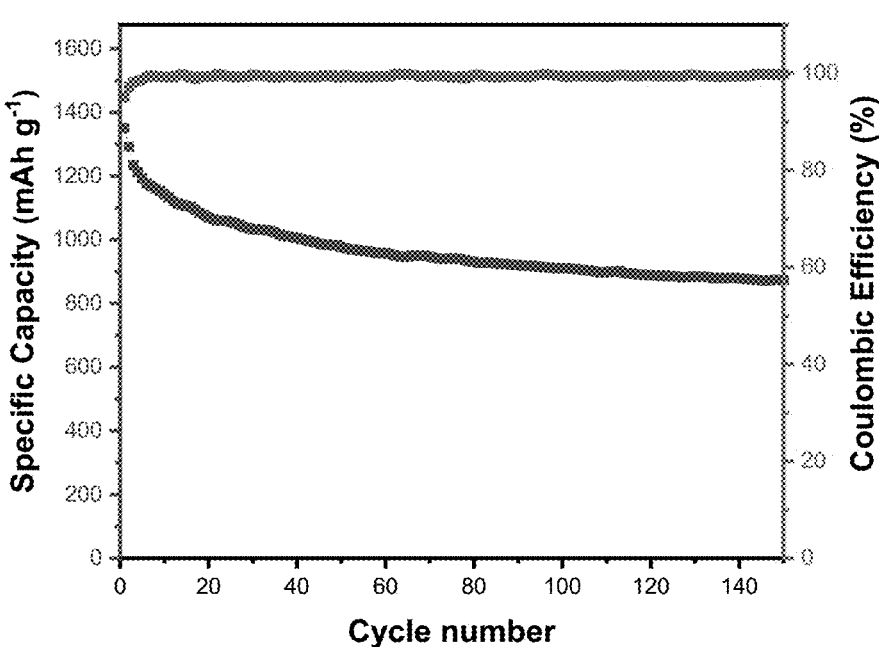
FIG. 19 is a graph showing the results of charge/discharge cycles performed at 0.5 C by applying the material TAB CPC/FePC, obtained in Example 3 of the present invention, to a lithium-sulfur battery.

FIG. 19 is a graph showing the results of cycling performed by applying the TAB CPC/FePC, produced in Example 3, to a lithium-sulfur battery. As can be seen from the graph, when driven at a rate of 0.5 C, the TAB CPC/FePC delivered a discharge capacity of 898 mAh/g in the $150^{th}$ cycle. Nitrogen atoms added by ammonia solution bubbling increased the density of single Fe metal atoms coordinating therewith, and as a result, the TAB CPC/FePC had higher electrochemical performance than the CPC and the CPC/FePC.

Figure 20:
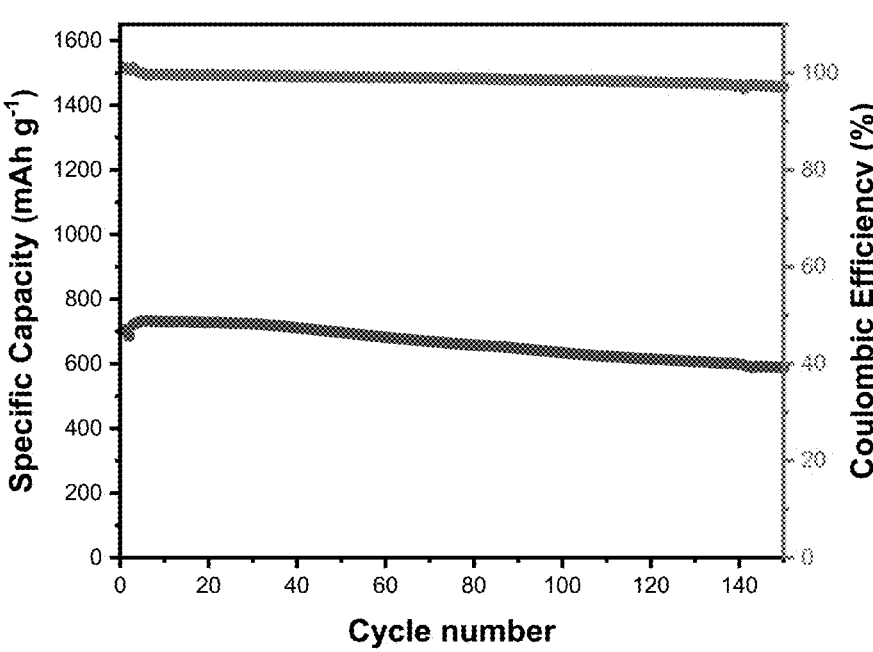
FIG. 20 is a graph showing the results of charge/discharge cycles performed at 7.0 C by applying the material TAB CPC/FePC, obtained in Example 3 of the present invention, to a lithium-sulfur battery.

FIG. 20 showing the results of cycling performed at a very high current density of 7.0 C by applying the TAB CPC/FePC, produced in Example 3, to a lithium-sulfur battery. As can be seen from the graph, when driven at a rate of 7.0 C, the TAB CPC/FePC delivered a discharge capacity of 587 mAh/g in the 150th cycle. These excellent electrochemical properties are interpreted in several ways. First, the Fe metal-based catalysts coordinating with nitrogen atoms are uniformly distributed in the hierarchical porous carbon material having a large surface area, thus suppressing release of the active material and maximizing the utilization of the catalyst, such as accelerating the reaction. In addition, the very large pore volume facilitates the movement of ions. Due to the complex action of these properties, the TAB CPC/FePC has excellent electrochemical performance.

Example 5: Production of Hierarchical Porous Carbon Nanofibers (CPCNFs) by Carbon Dioxide Treatment A method of homogeneously mixing a borohydride reducing agent and polyacrylonitrile and producing porous carbon nanofibers from carbon dioxide will be described in detail below.

0.5 g of polyacrylonitrile (PAN, Mw=150,000, Sigma-Aldrich) was completely dissolved in 5.3 mL of a dimethylformamide (DMF, >99.8%, Sigma-Aldrich) solution for 12 hours or more, and the solution was mixed with 0.25 g of sodium borohydride among the above-mentioned borohydrides for 30 minutes. Then, 2 mL of the solution was electrospun at a rate of 0.85 mL/hour at a voltage of 13 kV. Next, drying was performed at 100° C. for 24 hours to remove the solvent. After the solvent was completely removed, the fiber was placed in a reactor (furnace) which was then purged by flowing argon gas (Ar, >99.999%, Sam-O Gas Co.) at a rate of 60 mL/min. Next, the reactor temperature was raised from 25° C. to 200° C. at a rate of 5° C./min and maintained at 200° C. for 3 hours. Then, the temperature was raised from 200° C. to 500° C. at a rate of 5° C./min and maintained at 500° C. for 2 hours. In this case, at 400° C., argon gas was replaced with carbon dioxide ($CO_2$, >99.99%, Sam-O Gas Co.) which was flowed into the reactor at a rate of 100 mL/min. Next, the temperature was raised to 600° C. at a rate of 5° C./min and maintained at 600° C. for 1 hour. Next, carbon dioxide was replaced with argon gas, and then the temperature was raised to 800° C. at a rate of 5° C./min and maintained at 800° C. for 1 hour. After the reactor was cooled, the contents of the reactor were washed with 5M hydrochloric acid, hot water, cold water and ethanol to remove the produced salt, and the precipitate was dried in an oven at 100° C. at 1 atm for 24 hours. Here, the synthesized material was named $CO_2$-derived porous carbon nanofibers (CPCNFs).

Figure 21:
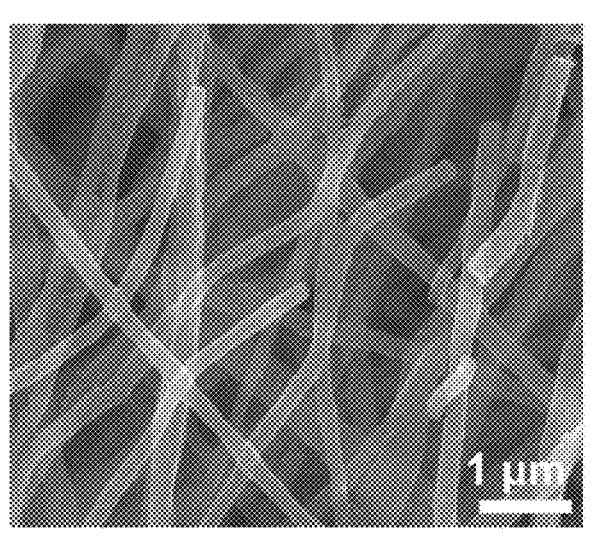
FIG. 21 shows SEM and TEM photographs of hierarchical porous carbon fibers (CPCNFs) obtained by carbon dioxide treatment in Example 5 of the present invention.
Figure 21:
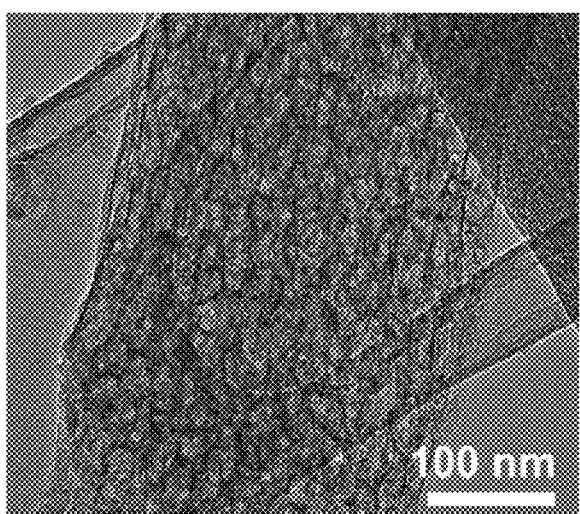

FIG. 21 shows SEM and TEM photographs of porous carbon nanofibers (CPCNFs) produced in Example 5 by mixing the borohydride reducing agent and polyacrylonitrile in Example 5 and then carbon dioxide treatment of the mixture and heat treatment in an argon gas atmosphere. It can be seen that salts are formed through the reaction of carbon dioxide with the borohydride reducing agent, and these salts act as templates and contribute to pore formation. From the SEM and TEM photographs, it can be seen that the produced carbon fibers have pores developed on the outside and inside thereof.

Example 6: Production of Transition Metal Phthalocyanine Catalyst-Containing Hierarchical Porous Carbon Nanofiber Composite (CPCNF/FePC)

To the CPCNFs produced by the method of Example 5, Fe phthalocyanine (>99%, Sigma Aldrich) was added using a simple immersion method. Next, a porous carbon fiber composite containing a metal catalyst was produced through a heat treatment process in an argon gas atmosphere. This production method will be described in detail below.

The CPCNFs of Example 5 above were immersed in a solution containing 0.01 g of Fe phthalocyanine, which has been dispersed in 100 ml of ethanol by applying ultrasound for 1 hour, and mixing was performed using a shaker at 150 rpm for 12 hours. After mixing, the CPCNF/Fe phthalocyanine mixture was dried in an oven at 100° C. at 1 atm for 24 hours.

The CPCNF/Fe phthalocyanine mixture dried through the above process was placed in a reactor (furnace) which was then purged with argon gas (Ar, >99.99%, Sam-O Gas Co.) at a rate of 60 mL/min for 30 minutes. Next, the temperature of the reactor was raised from 25° C. to 800° C. at a rate of 5° C./min and maintained at 800° C. for 1 hour. After the reactor was cooled, the produced carbon nanofiber Fe metal composite was recovered.

In order to remove aggregated Fe metal-based by-products from the carbon Fe metal composite recovered through the above process, treatment with 10 M hydrochloric acid was performed for 5 hours. Thereafter, the resulting material was washed with distilled water and ethanol until a neutral pH was reached, and the precipitate was dried in an oven at 100° C. at 1 atm for 24 hours. In this case, the synthesized material was composed of $CO_2$-derived porous carbon nanofibers (CPCNFs) and Fe-phthalocyanine (FePC), and thus named CPCNF/FePC.

Figure 22:
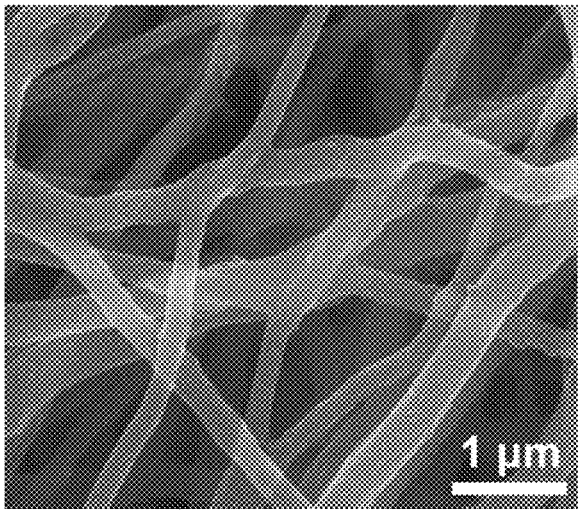
FIG. 22 shows SEM and TEM photographs of a transition metal phthalocyanine catalyst-containing hierarchical porous carbon nanofiber composite (CPCNF/FePC) obtained in Example 6 of the present invention.
Figure 22:
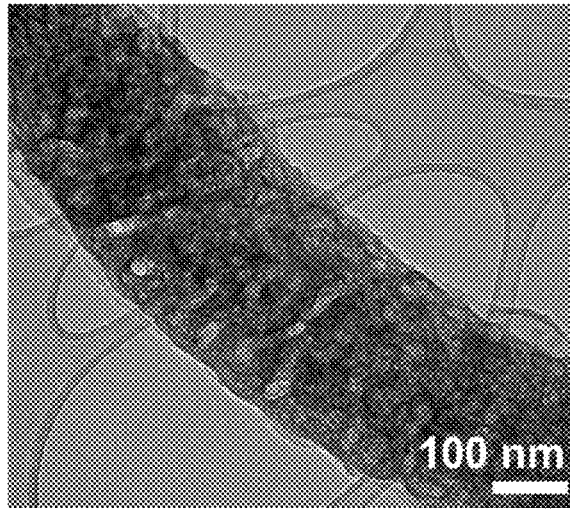

FIG. 22 shows SEM and TEM photographs of the transition metal phthalocyanine catalyst-containing hierarchical porous carbon nanofiber composite (CPCNF/FePC) produced in Example 6 by adding Fe-phthalocyanine to the porous carbon nanofibers through a simple immersion method, followed by heat treatment and washing. Referring to the SEM and TEM photographs, it is confirmed that, even after adding Fe phthalocyanine, agglomerated particles were not observed on the outer surface and inside, and the porous structure was retained.

Figure 23:
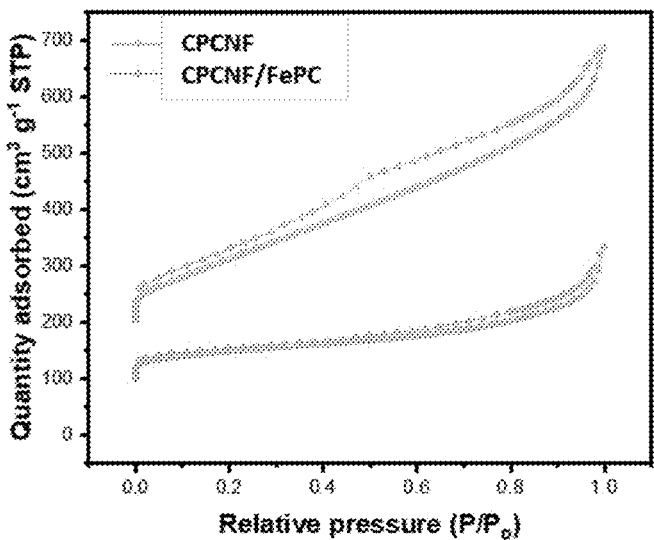
FIG. 23 is a graph showing nitrogen adsorption isotherm curves of the materials obtained in Examples 5 and 6 of the present invention.

FIG. 23 shows the results of BET analysis of the materials produced in Examples 5 and 6. The porous carbon nanofibers to which Fe phthalocyanine was not added had a surface area of about 400 $m^2$/g and a pore size of 0.75 $cm^3$/g, and the carbon nanofiber composite containing the catalyst had a reduced surface area of 240 $m^2$/g and a reduced pore size of 0.40 $cm^3$/g. From the reduced surface area and pore volume, it can be seen that the single-atom Fe metal was effectively bonded to the carbon nanofibers.

Figure 24:
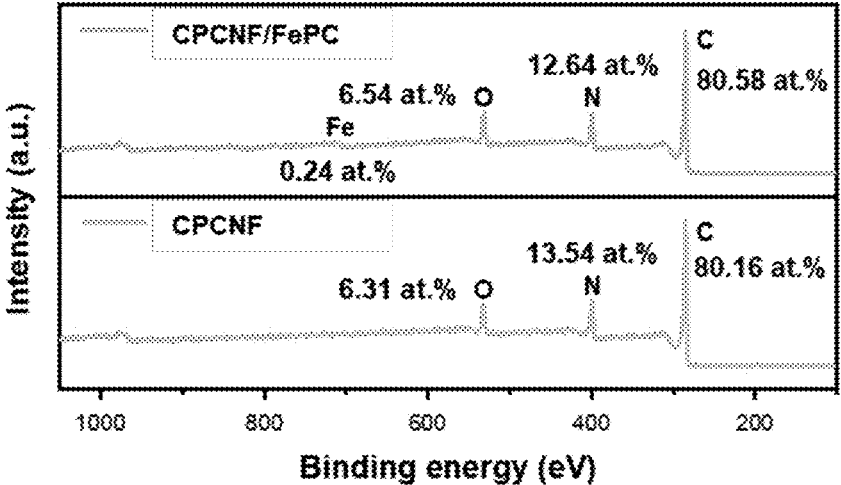
FIG. 24 is a graph showing the results of XPS survey of the materials obtained in Examples 5 and 6 of the present invention.

FIG. 24 shows the results of XPS analysis of the materials produced in Examples 5 and 6. It is confirmed that, in the case of the porous carbon nanofibers to which Fe phthalocyanine was not added, the signal for Fe was hardly observed, whereas, in the case of the porous carbon nanofibers to which Fe phthalocyanine was added, a peak related to Fe was observed.

Example 7: Electrochemical Measurement

Each of the materials synthesized in Examples 5 and 6 was applied as an interlayer for a lithium-sulfur battery, and the electrochemical properties thereof were examined. Specific performance thereof will be described below.

Figure 25:
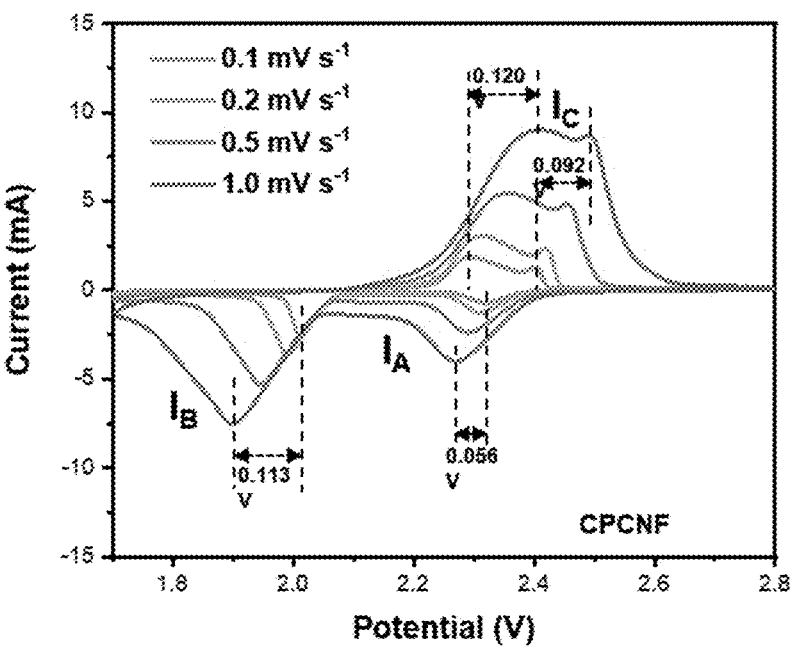
FIG. 25 is a graph showing the results of cyclic voltammetry (CV) performed at different voltage scan rates by applying each of the materials, obtained in Examples 5 and 6 of the present invention, as an interlayer for a lithium-sulfur battery.
Figure 25:
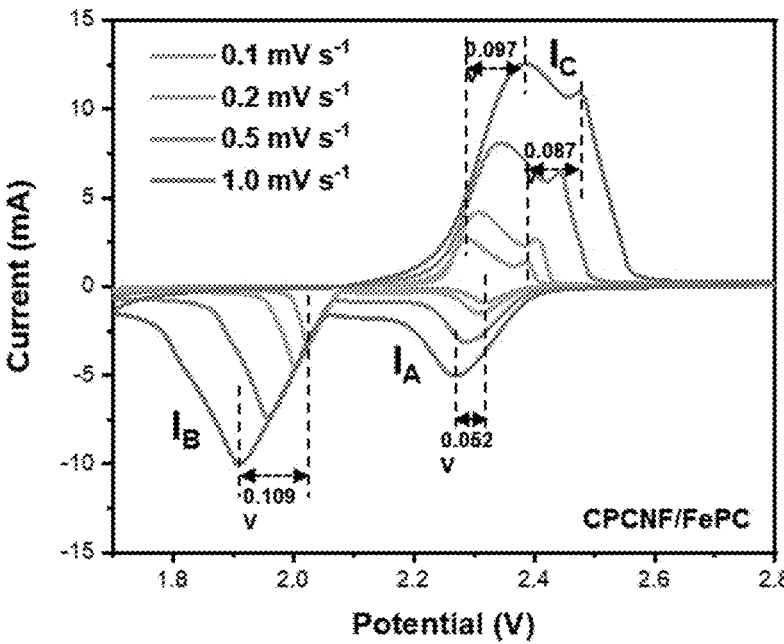

FIG. 25 shows the CV results obtained at a voltage scan rate of 0.1 to 1.0 mV/s within a voltage range of 1.7 to 2.8 V by using each of the materials, produced in Examples 5 and 6, as an interlayer for a lithium-sulfur battery. In the case of the carbon nanofibers to which the catalyst was not added, the current density related to oxidation and reduction reactions was lower than that in the catalyst-bound composite, and at the same time, as the voltage scan rate increased, the shift of the peak due to overvoltage became larger. As confirmed by XPS analysis, this is believed to be because Fe, acting as an electrochemical catalyst, was effectively bound to the carbon nanofibers, thus improving electrochemical performance of the carbon nanofibers.

Figure 26:
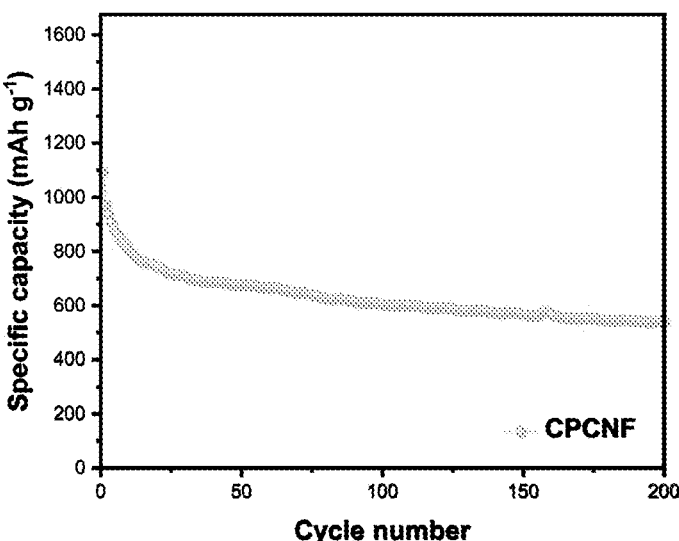
FIG. 26 is a graph showing the results of charge/discharge cycles performed at 0.5 C by applying the material CPCNF, obtained in Example 5 of the present invention, as an interlayer for a lithium-sulfur battery.

FIG. 26 is a graph showing the results of cycling performed by using the porous carbon material CPCNF, produced in Example 5, as an interlayer for a lithium-sulfur battery. As can be seen from the graph, when driven at a rate of 0.5 C, the porous carbon material delivered a discharge capacity of 1,000 mAh/g or more in the $1^{st}$ cycle and delivered a discharge capacity of about 540 mAh/g in the $200^{th}$ cycles.

Figure 27:
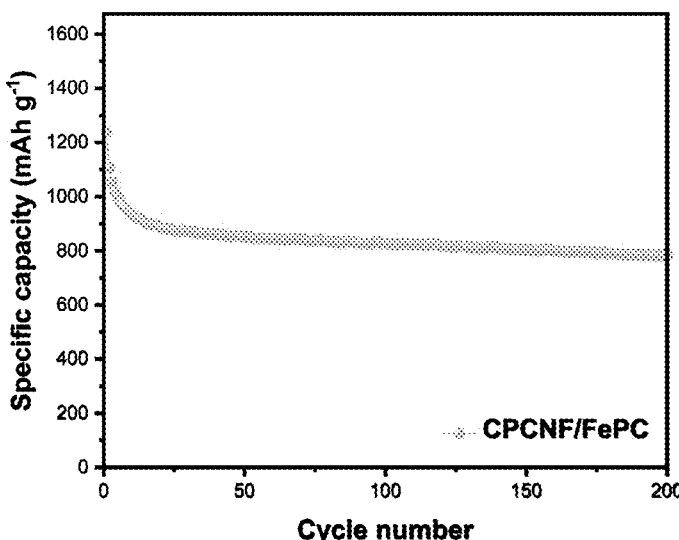
FIG. 27 is a graph showing the results of charge/discharge cycles performed at 0.5 C by applying the material CPCNF/FePC, obtained in Example 6 of the present invention, as an interlayer for a lithium-sulfur battery.

FIG. 27 is a graph showing the results of cycling performed by using the CPCNF/FePC, produced in Example 6, as an interlayer for a lithium-sulfur battery. As can be seen from the graph, when driven at a rate of 0.5 C, the CPCNF/FePC delivered a discharge capacity of about 1,200 mAh/g in the $1^{st}$ cycle and delivered a discharge capacity of 750 mAh/g or more in the $200^{th}$ cycles. The reason why the CPCNF/FePC has a higher discharge capacity than the CPCNF is that the single-atom iron metal catalysts coordinating with nitrogen atoms cause a rapid reaction, reducing the active material that is released by the shuttle phenomenon of lithium sulfide, and that the active material is more efficiently used.

Figure 28:
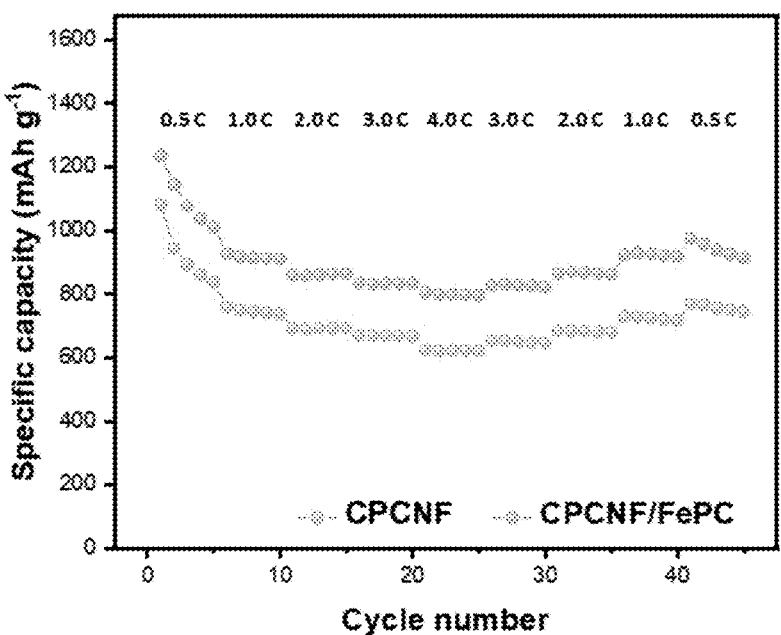
FIG. 28 is a graph showing the rate capability characteristics obtained at different current densities (0.5 to 4.0) by applying each of the materials, obtained in Examples 5 and 6 of the present invention, as an interlayer for a lithium-sulfur battery.

FIG. 28 is a graph showing the results of testing rate capability using each of CPCNF and CPCNF/FePC, produced in Examples 5 and 6, as an interlayer for a lithium-sulfur battery. As can be seen from the graph, CPCNF and FePC had a higher discharge capacity at all current densities. In addition, as the driving current density increased, the capability gap became more pronounced. These results are believed to be because the Fe metal-based catalysts coordinating with nitrogen atoms were uniformly distributed in the porous carbon nanofiber having a large surface area, thereby suppressing the release of the active material and maximizing the utilization of the catalysts, such as accelerating the reaction.

Although the present invention has been described in detail with reference to specific features, it will be apparent to those skilled in the art that this description is only of a preferred embodiment thereof, and does not limit the scope of the present invention. Thus, the substantial scope of the present invention will be defined by the appended claims and equivalents thereto.

The invention claimed is:

1. A method of preparing an amorphous hierarchical porous carbon material having micropores (<2 nm) and mesopores (2 to 50 nm), comprising
   continuous heat-treating a mixture of a reducing agent and nanotemplates in an inert gas and a carbon dioxide-containing gas at a temperature of 500 to 1,000° C. to obtain a solid product; and
   adding a nitrogen precursor to the obtained solid product, followed by heat treatment,
   wherein the heat treatment is treated with ammonia gas generated by bubbling an aqueous ammonia solution so that a percentage of nitrogen atoms in the solid product increases from 1-2 at % to 4-7 at %, and a content of nitrogen atoms in the solid product increases from 0.5-2.0 wt % to 3.0-6.0 wt %.

2. The method of preparing an amorphous hierarchical porous carbon material of claim 1, wherein the reducing agent is at least one selected from the group consisting of magnesium (Mg), magnesium hydride ($MgH_2$), sodium borohydride ($NaBH_4$), potassium borohydride ($KBH_4$), calcium borohydride (($Ca(BH_4)_2$), strontium borohydride ($Sr(BH_4)_2$), magnesium borohydride ($Mg(BH_4)_2$) and lithium borohydride ($LiBH_4$).

3. The method of preparing an amorphous hierarchical porous carbon material of claim 1, wherein the nanotemplates are an alkali metal, alkaline earth metal or transition metal oxide or carbonate.

4. The method of preparing an amorphous hierarchical porous carbon material of claim 1, wherein the bubbling an aqueous ammonia solution is performed with an inert carrier gas at a temperature of 500 to 1,000° C.

\* \* \* \* \*